(12) United States Patent
Kato et al.

(10) Patent No.: US 10,062,875 B2
(45) Date of Patent: Aug. 28, 2018

(54) METHOD OF MANUFACTURING SECONDARY BATTERY INCLUDING FIXING TAPE AND PROTECTION MEMBER, AND SECONDARY BATTERY

(71) Applicant: TOYOTA JIDOSHA KABUSHIKI KAISHA, Toyota-shi, Aichi-ken (JP)

(72) Inventors: Masashi Kato, Konan (JP); Mizuho Matsumoto, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 208 days.

(21) Appl. No.: 14/925,445

(22) Filed: Oct. 28, 2015

(65) Prior Publication Data

US 2016/0126583 A1 May 5, 2016

(30) Foreign Application Priority Data

Oct. 30, 2014 (JP) ................. 2014-222007

(51) Int. Cl.
| | |
|---|---|
| *H01M 2/02* | (2006.01) |
| *H01M 2/08* | (2006.01) |
| *H01M 10/04* | (2006.01) |
| *H01M 10/05* | (2010.01) |
| *H01M 10/052* | (2010.01) |
| *H01M 10/0585* | (2010.01) |

(52) U.S. Cl.
CPC ............ *H01M 2/08* (2013.01); *H01M 2/024* (2013.01); *H01M 10/049* (2013.01); *H01M 10/0413* (2013.01); *H01M 10/0468* (2013.01); *H01M 10/052* (2013.01); *H01M 10/0585* (2013.01)

(58) Field of Classification Search
CPC .......... H01M 10/049; H01M 10/0413; H01M 10/0468; H01M 10/052; H01M 10/0585; H01M 2/024; H01M 2/08
USPC ....... 429/185, 186; 29/623.1, 623.2; 242/430
See application file for complete search history.

(56) References Cited

U.S. PATENT DOCUMENTS

| | | | |
|---|---|---|---|
| 6,743,546 B1 * | 6/2004 | Kaneda | H01M 2/021 429/127 |
| 2004/0038125 A1 | 2/2004 | Kim et al. | |
| 2011/0223465 A1 | 9/2011 | Kanda | |
| 2011/0244319 A1 * | 10/2011 | Hashimoto | H01M 2/021 429/186 |
| 2013/0130088 A1 | 5/2013 | Hashizaki | |

FOREIGN PATENT DOCUMENTS

| | | |
|---|---|---|
| CN | 102138244 A | 7/2011 |
| CN | 203166013 U | 8/2013 |
| JP | 04-010361 A | 1/1992 |

(Continued)

*Primary Examiner* — Sean P Cullen
(74) *Attorney, Agent, or Firm* — Sughrue Mion, PLLC

(57) ABSTRACT

In a fixing process, a fixing tape is wound around a first side surface of an electrode body and a second side surface which is a rear surface of the first side surface across a first end surface and a second end surface positioned at both ends of the electrode body in a stacking direction of the electrode body, from an outside of the stacked electrode body. In a stacking process before the fixing process, the electrode body is formed, and at least at a corner in the first and second side surfaces of the electrode body on a downstream side of a direction in which the fixing tape is wound, a protection member which protects the corner is disposed.

5 Claims, 13 Drawing Sheets

(56) References Cited

FOREIGN PATENT DOCUMENTS

| | | |
|---|---|---|
| JP | 2004-47161 A | 2/2004 |
| JP | 2012059363 A | 3/2012 |
| JP | 2014-041724 A | 3/2014 |
| JP | 2014-049303 A | 3/2014 |
| JP | 2014-093128 A | 5/2014 |
| KR | 1020030096717 A | 12/2003 |
| WO | 2010113273 A1 | 10/2010 |

* cited by examiner

METHOD OF MANUFACTURING SECONDARY BATTERY INCLUDING FIXING TAPE AND PROTECTION MEMBER, AND SECONDARY BATTERY

INCORPORATION BY REFERENCE

The disclosure of Japanese Patent Application No. 2014-222007 filed on Oct. 30, 2014 including the specification, drawings and abstract is incorporated herein by reference in its entirety.

BACKGROUND OF THE INVENTION

1. Field of the Invention

The invention relates to a method of manufacturing a secondary battery and the secondary battery. More specifically, the invention relates to a method of manufacturing a secondary battery having a stacked electrode body which is made by stacking positive and negative plates while interposing separators therebetween, and the secondary battery.

2. Description of Related Art

A stacked electrode body is manufactured by stacking positive and negative plates which are made by forming active material layers on both surfaces thereof, and interposing separators therebetween. In the stacked electrode body, a positional shift in which the positions of the electrode plates and the separators are shifted on a plane perpendicular to the stacking direction easily occurs. Therefore, it is preferable that the positional shift is appropriately suppressed in the stacked electrode body.

For example, in Japanese Patent Application Publication No. 2014-41724 (JP 2014-41724 A), a power storage device which is made by winding a sheet member as a fixing member around the outer periphery of an electrode assembly which is a stacked body of positive electrodes, negative electrodes, and separators, and accommodating the resultant in a case is disclosed. In JP 2014-41724 A, the sheet member is wound so that the joint thereof is positioned on a side surface of the electrode assembly. Accordingly, it is thought that even in a case where a load is exerted on the electrode assembly in the stacking direction, the load is uniformly applied to the electrode assembly, and thus the degradation in the performance of the power storage device is suppressed.

However, in the related art described above, when a fixing sheet which fixes an electrode body is wound around the electrode body, there is a possibility that the electrode plates or separators may curl up in the vicinity of the corners of the electrode body. Curling of the electrode body easily occurs particularly in the electrode body in which a negative plate having a larger area than that of a positive plate is used and the negative electrode is stacked at a position at the end of the electrode body in the stacking direction. In addition, in a secondary battery, there is a possibility that an appropriate charge-discharge reaction may not occur at the position where curling of the electrode body occurs. Accordingly, there is a possibility that the secondary battery capable of exhibiting sufficient performance may not be stably manufactured.

SUMMARY OF THE INVENTION

The invention provides a method of manufacturing a secondary battery having a stacked electrode body in which curling of an electrode plate or the like due to winding of a fixing tape does not occur, and the secondary battery.

According to an aspect of the invention, a method of manufacturing a secondary battery which includes a stacked electrode body which is made by stacking a positive plate and a negative plate while interposing a separator between the positive plate and the negative plate, a fixing tape which is wound around an outside of the stacked electrode body and prevents deformation of the electrode body, and a battery case in which the electrode body around which the fixing tape is wound and an electrolyte are accommodated, includes: stacking the positive plate, the negative plate, and the separator, forming the electrode body through the stacking, and disposing a protection member having higher bending strength than any of the positive plate, the negative plate, and the separator on at least an outer peripheral surface of the electrode body; winding the fixing tape, across at least a first end surface and a second end surface positioned at both ends of the electrode body in a stacking direction of the electrode body, around a first side surface adjacent to the first end surface and the second end surface of the electrode body and a second side surface which is a rear surface of the first side surface, from an outside of a portion of the electrode body on which the protection member is disposed, and fixing the fixing tape; and accommodating the electrode body around which the fixing tape is wound and the electrolyte in the battery case, wherein during the stacking, the protection member is disposed on at least one of the first end surface and the first side surface at a first corner where the first end surface and the first side surface of the electrode body intersect, and at least one of the second end surface and the second side surface at a second corner where the second end surface and the second side surface of the electrode body intersect, and during the fixing, the fixing tape is wound around the first side surface of the electrode body in a direction from the second end surface toward the first end surface, and is wound around the second side surface of the electrode body in a direction from the first end surface toward the second end surface.

In the method of manufacturing a secondary battery, the fixing tape is wound around the first side surface of the electrode body in the direction from the second end surface tow the first end surface in the state where the protection member is disposed on at least one of the first end surface and the first side surface at the first corner. In addition, the fixing tape is wound around the second side surface of the electrode body in the direction from the first end surface toward the second end surface in the state where the protection member is disposed on at least one of the second end surface and the second side surface at the second corner. Therefore, during the winding of the fixing tape, the electrode plate or the like is not bent in an outward direction in relation to the stacking direction at the first and second corners of the electrode body. Accordingly, a secondary battery having a stacked electrode body in which curling of an electrode plate or the like due to winding of a fixing tape does not occur can be manufactured.

According to another aspect of the invention, a method of manufacturing a secondary battery which includes a stacked electrode body which is made by stacking a positive plate and a negative plate while interposing a separator between the positive plate and the negative plate, a fixing tape which is wound around an outside of the stacked electrode body and prevents deformation of the electrode body, and a battery case in which the electrode body around which the fixing tape is wound and an electrolyte are accommodated, includes: stacking the positive plate, the negative plate, and the separator, forming the electrode body through the stacking, and disposing a protection member having higher bending strength than any of the positive plate, the negative plate, and the separator on at least an outer peripheral surface of the electrode body; winding the fixing tape, across at least a first end surface and a second end surface positioned at both ends of the electrode body in a stacking direction of the electrode body, around a first side surface adjacent to the first end surface and the second end surface of the electrode body and a second side surface which is a rear surface of the first side surface, from an outside of a portion of the electrode body on which the protection member is disposed, and fixing the fixing tape; and accommodating the electrode body around which the fixing tape is wound and the electrolyte in the battery case, wherein during the stacking, the protection member is disposed on at least one of the first end surface and the first side surface at a first corner where the first end surface and the first side surface of the electrode body intersect, and at least one of the first end surface and the second side surface at a third corner which is positioned on the opposite side of the first corner of the electrode body with the first end surface interposed between the first corner and the third corner, and during the fixing, the fixing tape is wound around the first side surface of the electrode body in a direction from the second end surface toward the first end surface, and is wound around the second side surface of the electrode body in a direction from the second end surface toward the first end surface. In the method of manufacturing a secondary battery, the second corner in the above-described aspect is changed to the third corner for being distinguished from the second corner in the method of manufacturing a secondary battery described above.

In the method of manufacturing a secondary battery, the fixing tape is wound around the first side surface of the electrode body in the direction from the second end surface toward the first end surface in the state where the protection member is disposed on at least one of the first end surface and the first side surface at the first corner. In addition, the fixing tape is wound around the second side surface of the electrode body in the direction from the second end surface toward the first end surface in the state where the protection member is disposed on at least one of the first end surface and the second side surface at the third corner. Therefore, during the winding of the fixing tape, the electrode plate or the like is not bent in an outward direction in relation to the stacking direction at the first and third corners of the electrode body. Accordingly, a secondary battery having a stacked electrode body in which curling of an electrode plate or the like due to winding of a fixing tape does not occur can be manufactured.

In the method of manufacturing a secondary battery described above, the protection member may be used which includes a first side surface portion positioned on the first side surface of the electrode body in a state where the protection member is disposed on the electrode body, a second side surface portion positioned on the second side surface of the electrode body, and a stacked portion which is positioned between stacks of the electrode body and of which both ends are respectively connected to the first side surface portion and the second side surface portion, the first side surface portion may extend from the end of the stacked portion on the first side surface side toward the first corner, and the second side surface portion may extend from the end of the stacked portion on the second side surface side toward the second corner (or the third corner). This is because the first and second side surface portions of the protection member having higher bending strength than the electrode plate or the like are disposed between the side surface at the corner and the fixing tape at the corner of the electrode body where curling of the electrode plate or the like easily occurs due to the winding of the fixing tape. Accordingly, the fixing can be performed without the occurrence of curling of the electrode plate or the like due to the winding of the fixing tape.

In the method of manufacturing a secondary battery described above, as the protection member, a first end surface protection member which is stacked on the first end surface of the electrode body to be disposed thereon and a second end surface protection member which is stacked on the second end surface of the electrode body to be disposed thereon may be used, the first end surface protection member may include a first protection portion that extends toward at least the first side surface in a state where the first end surface protection member is disposed on the electrode body, and the second end surface protection member may include a second protection portion that extends toward at least the second side surface in a state where the second end surface protection member is disposed on the electrode body. This is because the first and second protection portions of the protection member having higher bending strength than the electrode plate or the like are disposed between the end surface at the corner and the fixing tape at the corner of the electrode body where curling of the electrode plate or the like easily occurs due to the winding of the fixing tape. Accordingly, the fixing can be performed without the occurrence of curling of the electrode plate or the like due to the winding of the fixing tape.

In the method of manufacturing a secondary battery described above, as the protection member, an end surface protection member which is stacked on the first end surface of the electrode body to be disposed thereon may be used, and the end surface protection member may include a first protection portion that extends toward at least the first side surface and a second protection portion that extends toward at least the second side surface in a state where the end surface protection member is disposed on the electrode body. This is because the first and second protection portions of the protection member having higher bending strength than the electrode plate or the like are disposed between the end surface at the corner and the fixing tape at the corner of the electrode body where curling of the electrode plate or the like easily occurs due to the winding of the fixing tape. Accordingly, the fixing can be performed without the occurrence of curling of the electrode plate or the like due to the winding of the fixing tape.

In the method of manufacturing a secondary battery described above, in the state where the protection member is disposed on the electrode body, the first protection portion may protrude outward from the first side surface, and the second protection portion may protrude outward from the second side surface. This is because, at the corner of the electrode body where curling of the electrode plate or the like easily occurs due to the winding of the fixing tape, the fixing can be performed while a gap is formed between the side surface at the corner and the fixing tape.

In the method of manufacturing a secondary battery described above, the first end surface protection member may include a first protrusion which protrudes outward from the second side surface while the first protection portion protrudes outward from the first side surface in the state where the first end surface protection member is disposed on the electrode body, and the second end surface protection member may include a second protrusion which protrudes outward from the first side surface while the second protection portion protrudes outward from the second side surface in the state where the second end surface protection member is disposed on the electrode body. This is because the protection member positioned on both end surfaces of the electrode body protrudes from both side surfaces of the electrode body and thus the positioning of the electrode body in the battery case can be accurately performed by the protection member during the accommodating.

In the method of manufacturing a secondary battery described above, the battery case which includes a case body having an opening and a sealing member which blocks the opening of the case body may be used, the protection member may be used which includes a pressing portion that protrudes from one side surface among the side surfaces adjacent to the first end surface and the second end surface of the electrode body in a state where the protection member is disposed on the electrode body, and during the accommodating, the electrode body may be accommodated in an inner portion of the case body which is positioned further inward than the opening by pressing the pressing portion toward the inner portion of the case body while the side surface on the opposite side of the side surface of the electrode body from which the pressing portion of the protection member protrudes is directed toward the opening of the case body, and the opening of the case body having the electrode body accommodated in the inner portion of the case body is sealed by the sealing member. This is because the electrode body can be accommodated in the battery case while pressing the pressing portion of the protection member and thus crushing of the electrode plate or the like of the electrode body due to the pressing can be suppressed during the accommodating.

According to another aspect of the invention, a secondary battery includes: a stacked electrode body which is made by stacking a positive plate and a negative plate while interposing a separator between the positive plate and the negative plate; a fixing tape which is wound around an outside of the stacked electrode body and prevents deformation of the electrode body; a battery case in which the electrode body around which the fixing tape is wound and an electrolyte are accommodated; and a protection member which is positioned between the fixing tape and the electrode body and has higher bending strength than any of the positive plate, the negative plate, and the separator, wherein the fixing tape is wound, across at least a first end surface and a second end surface positioned at both ends of the electrode body in a stacking direction of the electrode body, around a first side surface adjacent to the first end surface and the second end surface of the electrode body and a second side surface which is a rear surface of the first side surface, from an outside of the stacked electrode body, and the protection member is disposed between at least one of the first end surface and the first side surface and the fixing tape at a first corner where the first end surface and the first side surface of the electrode body intersect, between at least one of the first end surface and the second side surface and the fixing tape at a second corner which is positioned on the opposite side of the first corner of the electrode body with the first end surface interposed between the first corner and the second corner, or between at least one of the second end surface and the second side surface and the fixing tape at a third corner which is positioned on the opposite side of the second corner of the electrode body with the second side surface interposed between the second corner and the third corner.

In the secondary battery of the invention, the protection member is disposed between the electrode body and the fixing tape at the corner of the electrode body where curling of the electrode plate or the like easily occurs due to the winding of the fixing tape. Accordingly, a secondary battery having a stacked electrode body in which curling of an electrode plate or the like due to winding of a fixing tape does not occur is achieved.

In the secondary battery described above, the protection member may include a first side surface portion positioned on the first side surface of the electrode body, a second side surface portion positioned on the second side surface of the electrode body, and a stacked portion which is positioned between stacks of the electrode body and of which both ends are respectively connected to the first side surface portion and the second side surface portion, the first side surface portion may extend from the end of the stacked portion on the first side surface side toward the first corner, and the second side surface portion may extend from the end of the stacked portion on the second side surface side toward the second corner or the third corner. This is because the first and second protection portions of the protection member having higher bending strength than the electrode plate or the like are disposed between the side surface at the corner and the fixing tape at the corner of the electrode body where curling of the electrode plate or the like easily occurs due to the winding of the fixing tape. Accordingly, a secondary battery having a stacked electrode body in which curling of an electrode plate or the like due to winding of a fixing tape does not occur is achieved.

In the secondary battery described above, as the protection member, a first end surface protection member which is stacked on the first end surface of the electrode body and a second end surface protection member which is stacked on the second end surface of the electrode body may be provided, the first end surface protection member may include a first protection portion that extends toward at least the first side surface, and the second end surface protection member may include a second protection portion that extends toward at least the second side surface. This is because the first and second protection portions of the protection member having higher bending strength than the electrode plate or the like are disposed between the end surface at the corner and the fixing tape at the corner of the electrode body where curling of the electrode plate or the like easily occurs due to the winding of the fixing tape. Accordingly, a secondary battery having a stacked electrode body in which curling of an electrode plate or the like due to winding of a fixing tape does not occur is achieved.

In the secondary battery described above, as the protection member, an end surface protection member which is stacked on the first end surface of the electrode body may be provided, and the end surface protection member may include a first protection portion that extends toward at least the first side surface and a second protection portion that extends toward at least the second side surface. This is because the first and second protection portions of the protection member having higher bending strength than the electrode plate or the like are disposed between the end surface at the corner and the fixing tape at the corner of the electrode body where curling of the electrode plate or the like easily occurs due to the winding of the fixing tape. Accordingly, a secondary battery having a stacked electrode body in which curling of an electrode plate or the like due to winding of a fixing tape does not occur is achieved.

In the secondary battery described above, the first protection portion may protrude outward from the first side surface, and the second protection portion may protrude outward from the second side surface. This is because, at the corner of the electrode body where curling of the electrode plate or the like easily occurs due to the winding of the fixing tape, a gap can be formed between the side surface at the corner and the fixing tape. Accordingly, a secondary battery having a stacked electrode body in which curling of an electrode plate or the like due to winding of a fixing tape does not occur is achieved.

In the secondary battery described above, the first end surface protection member may include a first protrusion which protrudes outward from the second side surface while the first protection portion protrudes outward from the first side surface, and the second end surface protection member may include a second protrusion which protrudes outward from the first side surface while the second protection portion protrudes outward from the second side surface. This is because the protection member positioned on both end surfaces of the electrode body protrudes from both side surfaces of the electrode body and thus the positioning of the electrode body in the battery case can be accurately performed by the protection member during the accommodating.

In the secondary battery described above, the battery case may include a case body having an opening and a sealing member which blocks the opening of the case body, the protection member may include a protrusion that protrudes from one side surface among the side surfaces adjacent to the first end surface and the second end surface of the electrode body, and the electrode body may be accommodated in an inner portion of the battery case while the side surface from which the protrusion of the protection member protrudes is directed toward the sealing member side. This is because the electrode body is accommodated in the battery case by pressing the protrusion of the protection member, and thus crushing of the electrode plate or the like of the electrode body is suppressed.

According to the invention, a method of manufacturing a secondary battery having a stacked electrode body in which curling of an electrode plate or the like due to winding of a fixing tape does not occur, and the secondary battery are provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, exemplary embodiments of the invention will be described in detail with reference to the drawings. In this embodiment, the invention is applied to a lithium-ion secondary battery.

First Embodiment

Figure 1:
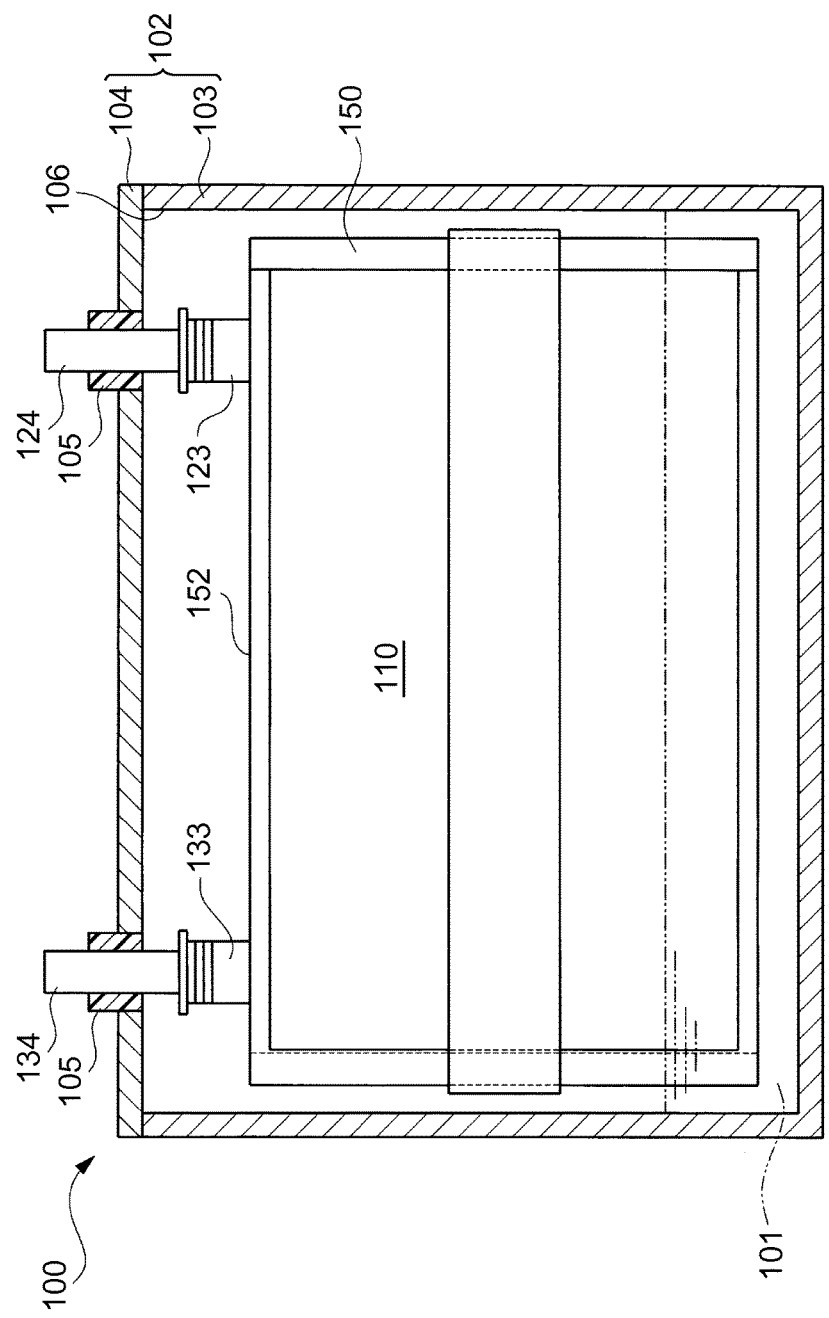
FIG. 1 is a sectional view of a battery according to a first embodiment.

A battery 100 (see FIG. 1) according to a first embodiment will be described. FIG. 1 is a sectional view of the battery 100 according to this embodiment. As illustrated in FIG. 1, the battery 100 is a lithium-ion secondary battery which is made by accommodating an electrode body 110 and an electrolyte 101 in a battery case 102. The electrolyte 101 is made of an organic solvent in which lithium salts are dissolved. The battery case 102 includes a case body 103 and a sealing member 104. In addition, the sealing member 104 includes an insulating member 105.

Figure 2:
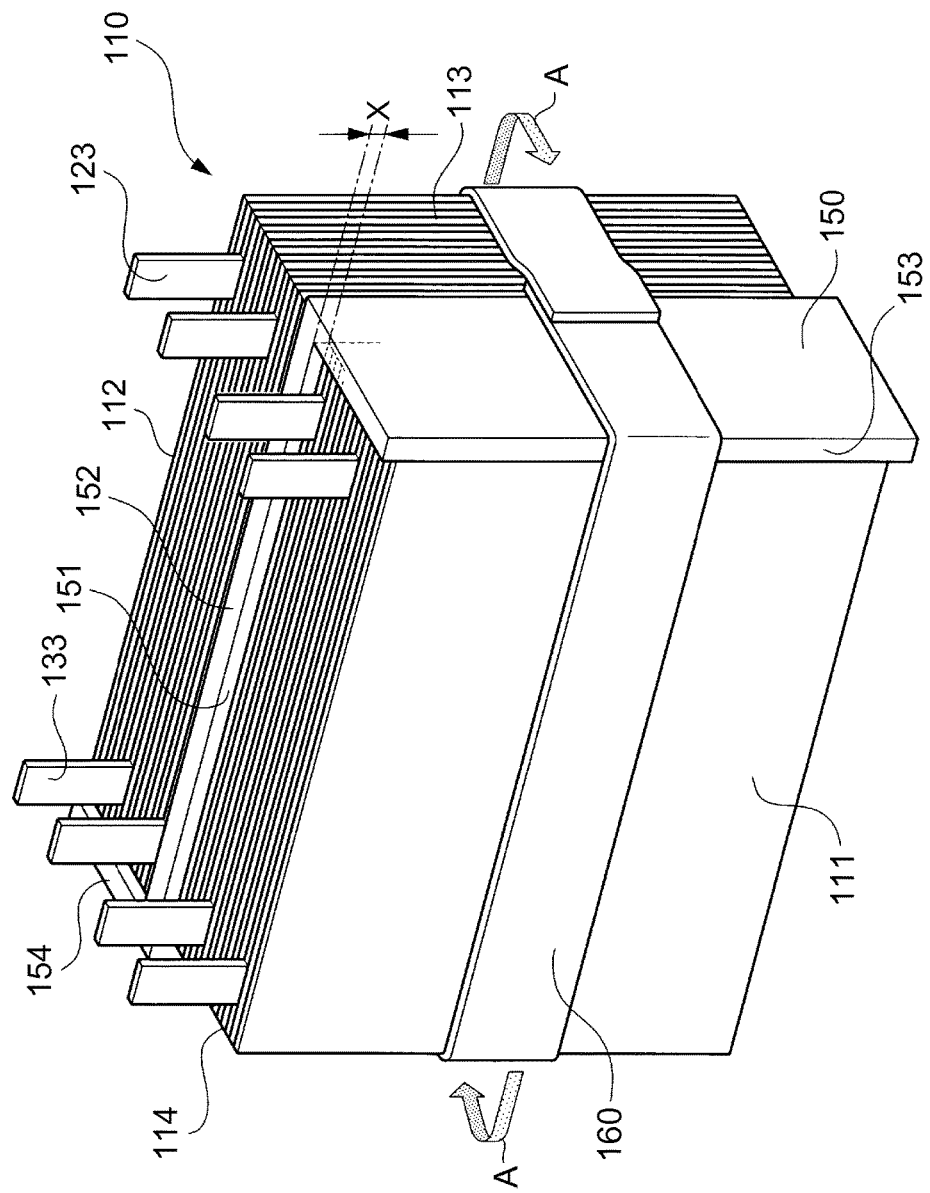
FIG. 2 is a perspective view of an electrode body according to the first embodiment.
Figure 3:
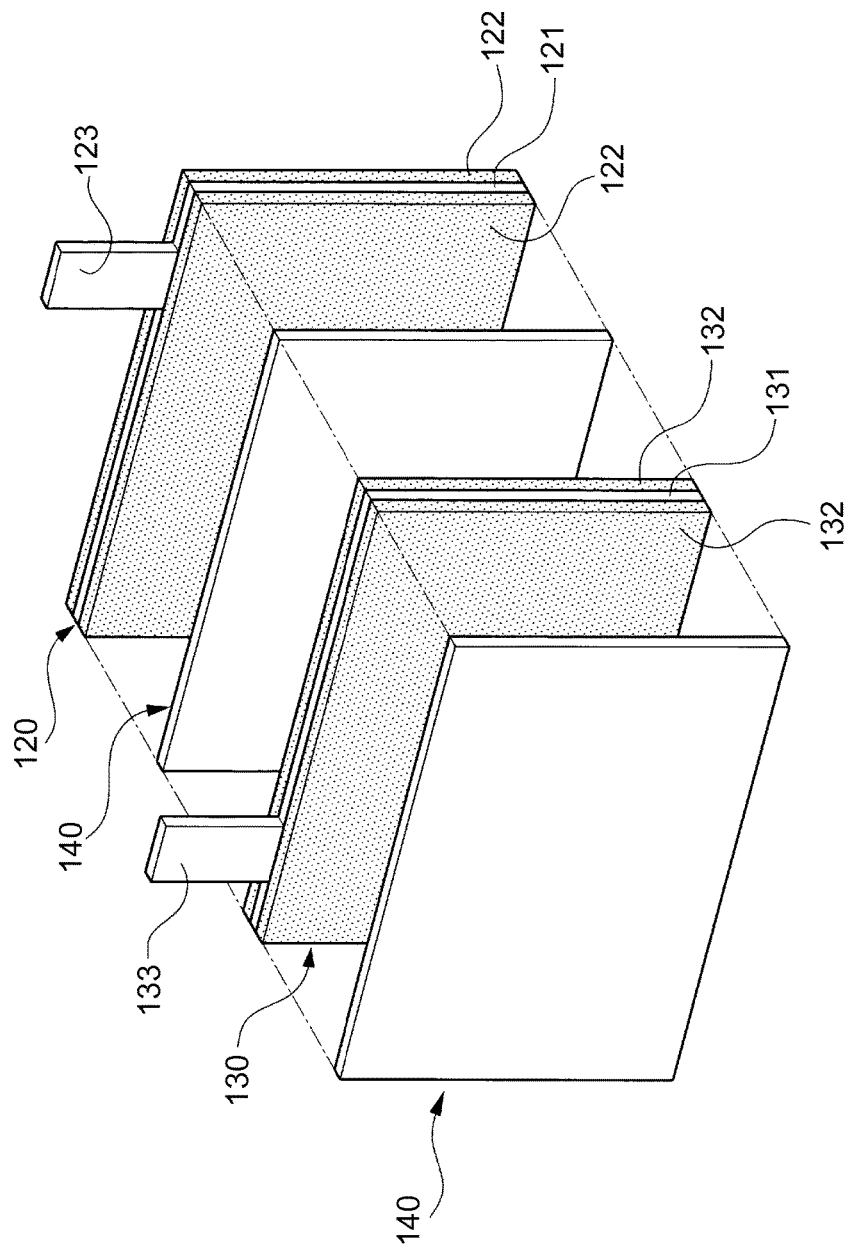
FIG. 3 is a view illustrating a positive plate, a negative plate, and a separator constituting the electrode body.

FIG. 2 is a perspective view of the electrode body 110. FIG. 3 is a view illustrating a positive plate 120, a negative plate 130, and a separator 140 constituting the electrode body 110. As illustrated in FIG. 3, the positive plate 120 is made by forming positive active material layers 122 of a positive electrode material including a positive active material, a binder, and the like on both surfaces of a positive electrode collector foil 121. In addition, the positive plate 120 includes a positive electrode tab 123 protruding upward from the other parts thereof. The positive active material layer 122 is not formed on a part of the positive electrode tab 123 of the positive plate 120 such that the positive electrode collector foil 121 is exposed from that part.

The negative plate 130 is made by forming negative active material layers 132 of a negative electrode material including a negative active material, a binder, and the like on both surfaces of a negative electrode collector foil 131. In addition, the negative plate 130 includes a negative electrode tab 133 protruding upward from the other parts thereof. The negative active material layer 132 is not formed on a part of the negative electrode tab 133 of the negative plate 130 such that the negative electrode collector foil 131 is exposed from that part. The separator 140 is a sheet-like porous member.

The electrode body 110 illustrated in FIG. 2 is a stacked electrode body which is made by flat stacking of a plurality of the positive plates 120, the negative plates 130, and the separators 140 interposed therebetween. In the electrode body 110, the positive electrode tabs 123 and the negative electrode tabs 133 protrude upward.

Furthermore, as illustrated in FIG. 2, a protection member 150 is assembled to the electrode body 110. The protection member 150 includes a stacked portion 151 and side surface portions 153, 154. The stacked portion 151 is a portion which is interposed between the stacks of the electrode bodies 110 and extends in the rightward and leftward directions of the electrode body 110.

In addition, the side surface portion 153 of the protection member 150 is a portion positioned on a side surface 113 on the right side adjacent to both end surfaces 111, 112 of the electrode body 110 in the stacking direction thereof. The side surface portion 154 is a portion positioned on a side surface 114 which is the rear surface of the side surface 113 of the electrode body 110. At least the side surface portions 153, 154 of the protection member 150 have higher bending strength than any of the positive plate 120, the negative plate 130, and the separator 140. Furthermore, as illustrated in FIG. 2, the protection member 150 of this embodiment includes a pressing portion 152 which protrudes upward from the upper side surface of the electrode body 110 excluding the positive electrode tab 123 and the negative electrode tab 133, by a length X.

Moreover, a fixing tape 160 is wound around the electrode body 110 in a state where the protection member 150 is assembled thereto. The fixing tape 160 is used for preventing a positional shift of the positive plate 120, the negative plate 130, and the separator 140 in the electrode body 110 using the binding force thereof generated by winding. The fixing tape 160 of this embodiment is wound to make one revolution around the outside of the electrode body 110 in a direction indicated by arrow A in FIG. 2. The end portions of the fixing tape 160 are bonded to each other on the side surface 113 of the electrode body 110.

In the battery 100 illustrated in FIG. 1, a positive electrode terminal 124 is connected to a bundle of the positive electrode tabs 123 of the electrode body 110, and a negative electrode terminal 134 is connected to a bundle of the negative electrode tabs 133. Ends of the positive electrode terminal 124 and the negative electrode terminal 134 on the side where the ends are not connected to the electrode body 110 protrude outward from the battery case 102 via the insulating members 105. In the battery 100, charging and discharging are performed by the electrode body 110 via the positive electrode terminal 124 and the negative electrode terminal 134. Specifically, in the battery 100, during charging and discharging, lithium ions are transported to and from the positive plate 120 and the negative plate 130 of the electrode body 110 via the electrolyte 101 held in the pores of the separator 140 which is a porous member.

Next, a method of manufacturing the battery 100 of this embodiment will be described. The battery 100 may be manufactured in the following order: 1. Stacking process, 2. Fixing process, and 3. Accommodation process.

In the "1. Stacking process", the electrode body 110 is formed by stacking the positive plates 120, the negative plates, 130, and the separators 140, which are manufactured in advance. In addition, in the stacking process, the assembly of the protection member 150 to the electrode body 110 is also performed. The assembly of the protection member 150 may be performed by disposing the stacked portion 151 of the protection member 150 to be interposed between two stacked bodies each in which a plurality of the positive plates 120, the negative plates 130, and the separators 140 are stacked in advance. Otherwise, the plurality of the positive plates 120, the negative plates 130, and the separators 140 may be stacked on each of both surfaces of the stacked portion 151 of the protection member 150. Accordingly, the assembly of the electrode body 110 and the protection member 150 can be manufactured.

Next, in the "2. Fixing process", the fixing tape 160 is wound around the assembly of the electrode body 110 and the protection member 150. That is, the fixing tape 160 is wound around the assembly of the electrode body 110 and the protection member 150 in the direction of arrow A illustrated in FIG. 2, and the starting end and the tail end of the wound tape are bonded to each other. During the winding of the fixing tape 160, the fixing tape 160 is wound while the tail end side thereof is pulled to a certain degree such that the electrode body 110 is fixed by appropriately binding the electrode body 110 using the fixing tape 160.

Subsequently, the "3. Accommodation process" is performed. That is, in the accommodation process, the electrode body 110 and the electrolyte 101 around which the fixing tape 160 is wound are accommodated in the battery case 102. Accordingly, the battery 100 can be manufactured. Before the electrode body 110 is accommodated in the battery case 102, the positive electrode tab 123 and the negative electrode tab 133 of the electrode body 110 are respectively bonded to the positive electrode terminal 124 and the negative electrode terminal 134.

Figure 4:
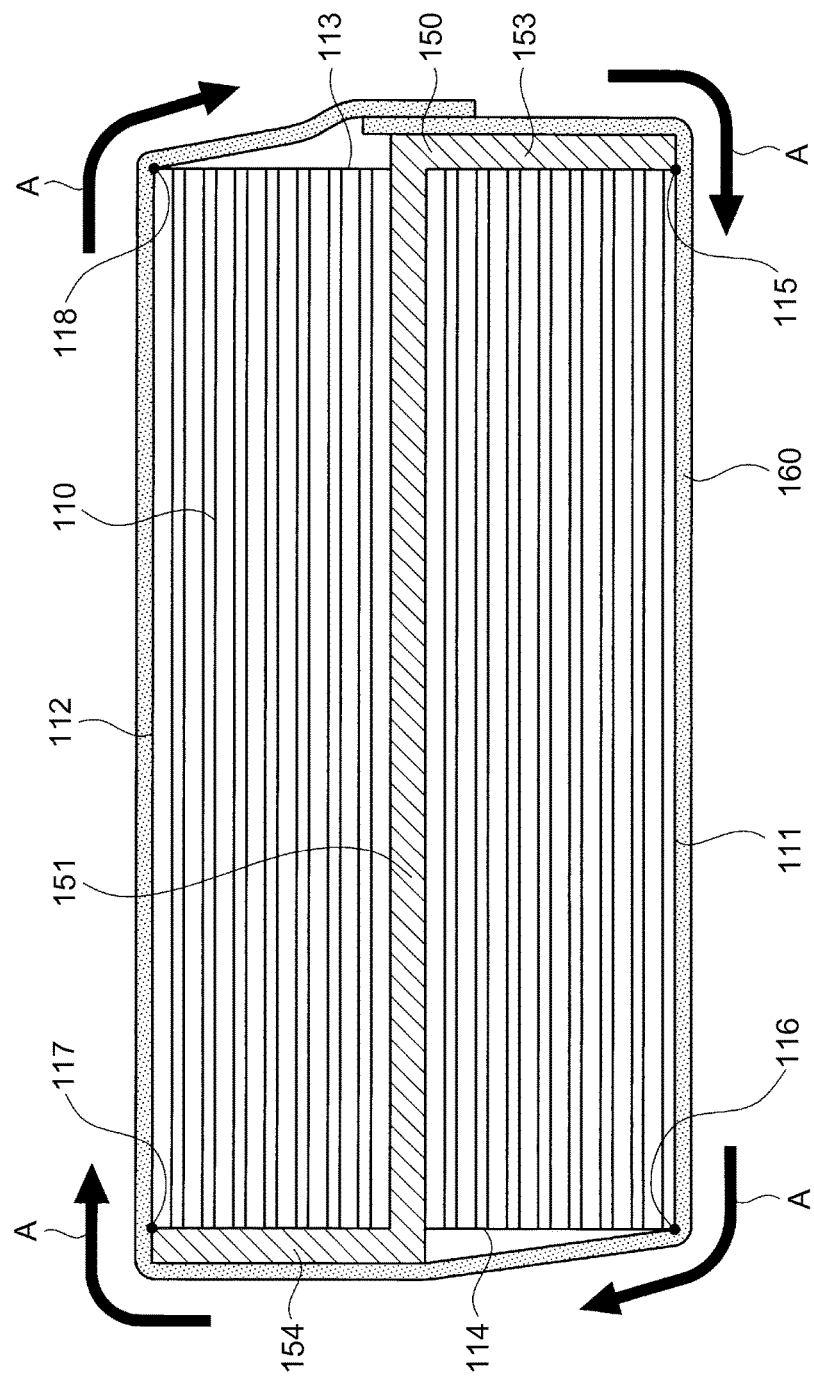
FIG. 4 is a sectional view of the electrode body according to the first embodiment, viewed at the position of a fixing tape.

Here, in this embodiment, the electrode body 110 having high quality due to the protection member 150 can be manufactured. This point will be described. FIG. 4 is a sectional view of the electrode body 110 viewed at the position of the fixing tape 160. The fixing tape 160 of this embodiment is wound to make one revolution around the outside of the electrode body 110 in the direction of arrow A illustrated in FIG. 4.

That is, in the fixing process, the fixing tape 160 is wound in order of the end surface 111, the side surface 114, the end surface 112, and the side surface 113 starting from the side surface 113 of the electrode body 110. Therefore, on the side surface 113, the fixing tape 160 is wound in a direction from the end surface 112 toward the end surface 111. On the side surface 114, the fixing tape 160 is wound in a direction from the end surface 111 toward the end surface 112.

In addition, in this embodiment, on the side surface 113 at a corner 115 where the side surface 113 and the end surface 111 of the electrode body 110 intersect, the side surface portion 153 of the protection member 150 is disposed. In addition, on the side surface 114 at a corner 117 where the end surface 112 and the side surface 114 of the electrode body 110 intersect, the side surface portion 154 of the protection member 150 is disposed.

That is, on the side surface 113 of the electrode body 110, the fixing tape 160 is wound in a direction from the end surface 112 toward the end surface 111 of the electrode body 110 in a state where the side surface portion 153 of the protection member 150 is disposed on the side surface 113 at the corner 115 of the electrode body 110. In addition, on the side surface 114 of the electrode body 110, the fixing tape 160 is wound in a direction from the end surface 111 toward the end surface 112 of the electrode body 110 in a state where the side surface portion 154 of the protection member 150 is disposed on the side surface 114 at the corner 117 of the electrode body 110.

Therefore, when the fixing tape 160 is wound, the vicinity of the corner 115 in the side surface 113 of the electrode body 110 does not come into contact with the fixing tape 160. In addition, the vicinity of the corner 117 in the side surface 114 of the electrode body 110 also does not come into contact with the fixing tape 160 when the fixing tape 160 is wound.

For example, in a case where the fixing tape 160 comes into contact with the vicinity of the corner 115 in the side surface 113 of the electrode body 110 or the vicinity of the corner 117 in the side surface 114 when the fixing tape 160 is wound, there is a possibility that curling may occur at the contact point. That is, the side surfaces 113, 114 of the electrode body 110 are formed by the end portions of the stacked positive plates 120, the negative plates 130, and the separators 140. In addition, all of the positive plates 120, the negative plates 130, and the separators 140 have a form of a thin sheet, and the bending strength thereof is not high.

Therefore, for example, when the fixing tape 160 is wound around the vicinity of the corner 115 in the side surface 113 of the electrode body 110 in the direction from the side surface 113 to the end surface 111, there is a possibility that the vicinity of the end portions of the positive plates 120, the negative plates 130, and the separators 140 may be bent and curl up. Similarly, when the fixing tape 160 is wound around the vicinity of the corner 117 in the side surface 114 in the direction from the side surface 114 to the end surface 112, there is a possibility that curling may occur.

In a case where curling occurs in an electrode body, the curled portion enters a state in which the portion does not substantially contribute to the charge-discharge reaction. This is because the charge-discharge reaction occurs between a positive plate and a negative plate which oppose each other with an electrolyte held in a separator provided therebetween. That is, depending on the electrode body where curling occurs, a battery having high quality cannot be manufactured.

Contrary to this, in this embodiment, the fixing tape 160 does not come into contact with the vicinity of the corner 115 of the side surface 113 of the electrode body 110 and the vicinity of the corner 117 of the side surface 114. Therefore, there is no possibility that curling occurs at the corners 115, 117 when the fixing tape 160 is wound.

In a case where the fixing tape 160 is wound in the direction of arrow A, a protection member may not be provided at a corner 116 where the end surface 111 and the side surface 114 of the electrode body 110 intersect. This is because, since the fixing tape 160 is wound in the direction from the end surface 111 toward the side surface 114, a force that makes the end portions of the positive plates 120, the negative plates 130, and the separators 140 at the corner 116 bend outward from the end surface 111 is not exerted on the end portions. Similarly, a protection member may not be provided at a corner 118 where the end surface 112 and the side surface 113 of the electrode body 110 intersect, because the fixing tape 160 is wound in the direction from the end surface 112 toward the side surface 113. When a protection member is not provided at the corners 116, 118, curling does not occur.

Accordingly, in the electrode body 110 of this embodiment, curling due to the winding of the fixing tape 160 does not occur even at any of the corners 115, 116, 117, 118, and sufficient performance can be stably exhibited during charging and discharging.

Furthermore, since there is no possibility that curling occurs in the electrode body 110 due to the protection member 150, the fixing tape 160 can be wound while being strongly pulled. Accordingly, the electrode body 110 can be more strongly bound by the fixing tape 160 compared to the related art. Therefore, in this embodiment, by increasing the binding force of the fixing tape 160, a positional shift of the positive plate 120, the negative plate 130, and the separator 140 in the electrode body 110 can be further suppressed compared to the related art.

Figure 5:
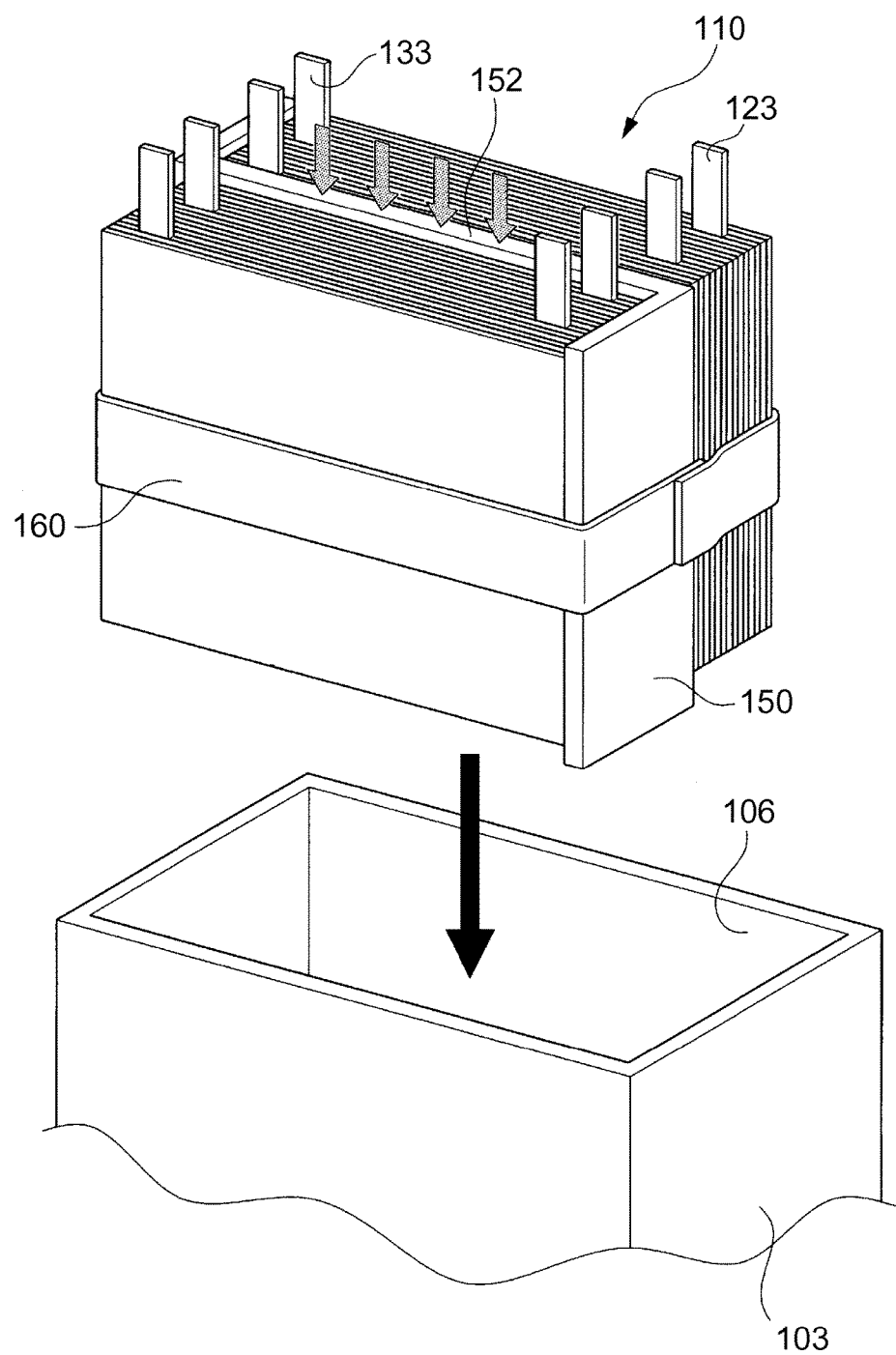
FIG. 5 is a view illustrating a method of accommodating the electrode body in a battery case.

As illustrated in FIG. 2, the protection member 150 of this embodiment further includes the pressing portion 152 which protrudes upward from the upper side surface of the electrode body 110 excluding the positive electrode tab 123 and the negative electrode tab 133, by the length X. In addition, as indicated by arrows in FIG. 5, the electrode body 110 can be accommodated in the case body 103 by pressing the pressing portion 152 of the protection member 150. Specifically, by allowing the lower side surface of the electrode body 110 which is positioned on the opposite side of the upper side surface from which the pressing portion 152 protrudes to be directed toward an opening 106 of the case body 103, and pressing the pressing portion 152 as indicated by arrows in FIG. 5, the electrode body 110 can be accommodated in the case body 103. For the pressing operation, it is preferable that the pressing portion 152 of the protection member 150 has higher bending strength than that of the positive plate 120 and the like.

In addition, the accommodation process can be performed without applying a force to the upper side surface of the electrode body 110 which is formed by the end portions of the positive plates 120, the negative plates 130, and the separators 140 which have low bending strength. Accordingly, crushing of the positive plate 120, the negative plate 130, and the separator 140 in the upper side surface of the electrode body 110 can be prevented.

After the electrode body 110 is accommodated in the case body 103, the opening 106 is closed as the sealing member 104 is bonded thereto. Therefore, in the battery 100 subjected to the accommodation process by pressing the pressing portion 152 of the protection member 150, as illustrated in FIG. 1, the electrode body 110 is accommodated in the battery case 102 such that the side surface from which the pressing portion 152 of the protection member 150 protrudes is directed toward the sealing member 104 side.

As illustrated in FIG. 2, in the electrode body 110 of this embodiment, the side surface portions 153, 154 of the protection member 150 having higher strength than those of the positive plate 120, the negative plate 130, and the separator 140 are respectively provided on the side surfaces 113, 114. Accordingly, without wrinkles or the like on the electrode body 110, the position of the electrode body 110 in the battery case 102 can be determined by the protection member 150 on the outer peripheral surface of the electrode body 110. Therefore, it is preferable that, for example, the distance between the inner walls of the case body 103, which oppose each other, is substantially equal the distance between the outer surfaces of the protection member 150, which oppose each other.

It is preferable that the protection member 150 has at least resistance to the electrolyte 101 and insulating properties. As such a material, for example, polypropylene (PP), polyethylene (PE), or the like may be employed. For example, in a case where the stacked portion 151 does not allow the electrolyte 101 to pass therethrough, as the positive plate 120 or the negative plate 130 which is adjacent to the stacked portion 151, a positive plate or a negative plate in which the positive electrode collector foil 121 or the negative electrode collector foil 131 is exposed to a surface that comes into contact with the stacked portion 151 may be used. In addition, in the case where the stacked portion 151 of the protection member 150 does not allow the electrolyte 101 to pass therethrough, the separator 140 may be allowed to be adjacent to the stacked portion 151. In this case, it is preferable that a surface of the separator 140 which is provided on the opposite side of the surface thereof that comes into contact with the stacked portion 151 is allowed to come into contact with the negative active material layer 132 of the negative plate 130.

In a case where the stacked portion 151 allows the electrolyte 101 to pass therethrough, as the positive plate 120 or the negative plate 130 which is adjacent to the stacked portion 151, a positive plate or a negative plate in which the positive active material layer 122 or the negative active material layer 132 is formed on the surface that comes into contact with the stacked portion 151 may be used. In this case, the stacked portion 151 of the protection member 150 may be provided with a plurality of through-holes which penetrate therethrough in the thickness direction for the passage of the electrolyte 101. The invention is particularly effective in a case where the negative plate 130 is stacked at an end position of the electrode body 110 in the stacking direction thereof. This is because a negative plate having a larger area than that of the positive plate 120 is generally used as the negative plate 130 due to the relationship in capacity ratio or the like. That is, this is because, in a case where the fixing process is performed without the use of the protection member 150, curling due to the winding of the fixing tape 160 around the end portion of the negative plate 130 positioned at the corner of the end of the electrode body 110 in the stacking direction easily occurs.

As described above in detail, the fixing tape 160 is wound around the electrode body 110 according to this embodiment. The fixing tape 160 is wound in the direction of arrow A in the state where the side surface portion 153 of the protection member 150 is disposed on the side surface 113 at the corner 115 of the electrode body 110 and the side surface portion 154 of the protection member 150 is disposed on the side surface 114 at the corner 117. Accordingly, a method of manufacturing a secondary battery having a stacked electrode body in which curling of an electrode plate or the like due to winding of a fixing tape does not occur, and the secondary battery are realized.

Second Embodiment

A second embodiment will be described. In the second embodiment, a different protection member from that of the first embodiment is used. Hereinafter, an electrode body of the protection member of this embodiment will be described in detail.

Figure 6:
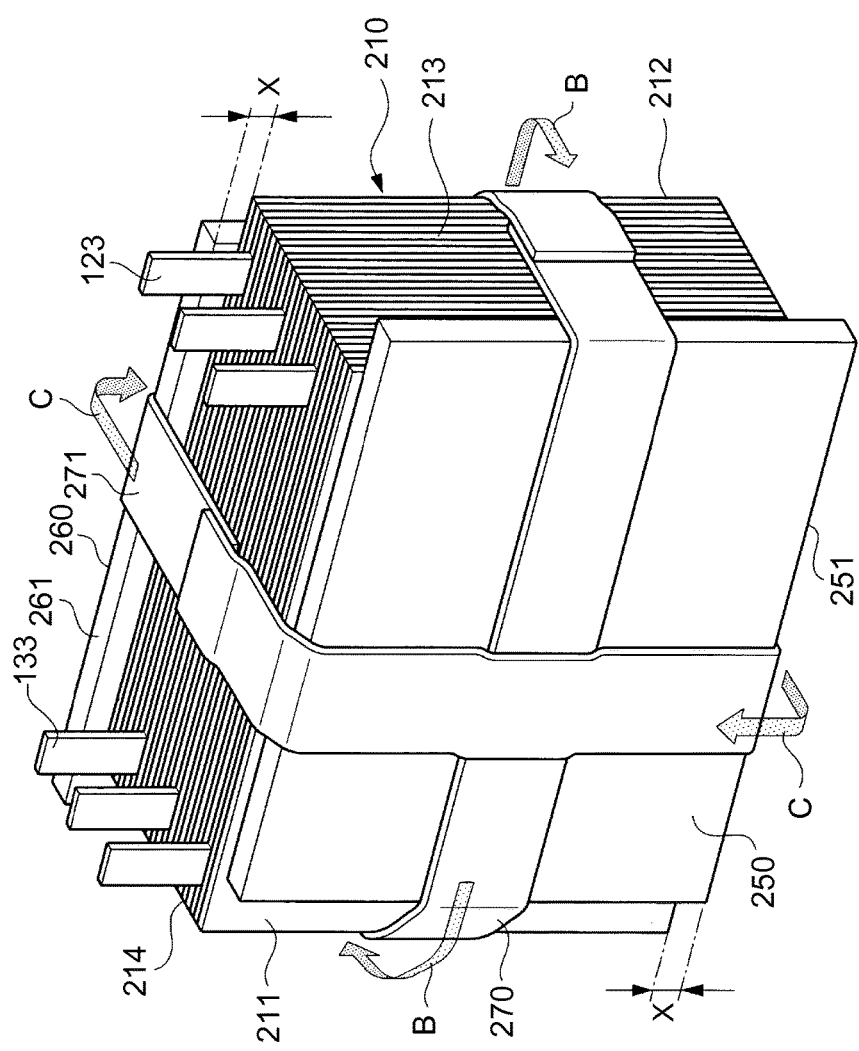
FIG. 6 is a perspective view of an electrode body according to a second embodiment.

FIG. 6 is a perspective view of an electrode body 210 according to this embodiment. As in the first embodiment, the electrode body 210 of this embodiment is also made by stacking of a plurality of the positive plates 120 and the negative plates 130 while interposing the separators 140 therebetween in a state where the positive electrode tabs 123 and the negative electrode tabs 133 protrude.

Protection members 250, 260 which are different from that of the first embodiment may be assembled to the electrode body 210 of this embodiment. Both of the protection members 250, 260 have higher bending strength than any of the positive plate 120, the negative plate 130, and the separator 140. The protection members 250, 260 are plate-like members which are respectively disposed on one end surface 211 of the electrode body 210 in the stacking direction and on an end surface 212 on the opposite side of the end surface 211. That is, fixing tapes 270, 271 are wound around the electrode body 210 of this embodiment in a state where the electrode body 210 is interposed between the protection members 250, 260 from both sides in the stacking direction thereof.

As illustrated in FIG. 6, the fixing tapes 270, 271 are wound to each make one revolution so as to intersect each other on the protection members 250, 260. The fixing tape 270 is wound in a direction of arrow B illustrated in FIG. 6 to make one revolution and is bonded on a right side surface 213 of the electrode body 210. The fixing tape 271 is wound in a direction of arrow C illustrated in FIG. 6 to make one revolution and is bonded on the upper side surface of the electrode body 210.

Even in the electrode body 210 of this embodiment, the positive electrode tabs 123 and the negative electrode tabs 133 which protrude from the upper side surface may be respectively bound and connected to the positive electrode terminal 124 and the negative electrode terminal 134, and the electrode body 210 is accommodated in the battery case 102 along with the electrolyte 101, thereby forming a battery. Even in the battery where the electrode body 210 is accommodated, charging and discharging can be performed by the electrode body 210 via the positive electrode terminal 124 and the negative electrode terminal 134.

In addition, the battery which uses the electrode body 210 may also be manufactured in the same order as in the first embodiment. That is, in the "1. Stacking process", the electrode body 210 is formed by stacking the positive plates 120, the negative plates 130, and the separators 140. In addition, in the stacking process, the protection members 250, 260 are respectively stacked on the end surfaces 211, 212 of the electrode body 210 so as to be disposed thereon.

Next, in the "2. Fixing process", the fixing tapes 270, 271 are wound. That is, the fixing tape 270 is first wound around the outside of the electrode body 210 having the protection members 250, 260 disposed at predetermined positions, in a direction of arrow B illustrated in FIG. 6, and the starting end and the tail end of the wound tape are bonded to each other. The fixing tape 271 is then wound in a direction of arrow C illustrated in FIG. 6, and the starting end and the tail end of the wound tape are bonded to each other. In order to fix the electrode body 210, during the winding of the fixing tapes 270, 271, the fixing tapes 270, 271 are also wound while the tail end sides thereof are pulled to certain degrees.

Subsequently, the "3. Accommodation process" is performed. That is, in the accommodation process, the electrode body 210 and the electrolyte 101 around which the fixing tapes 270, 271 are wound are accommodated in the battery case 102. Accordingly, the battery having the electrode body 210 accommodated therein can be manufactured.

Figure 7:
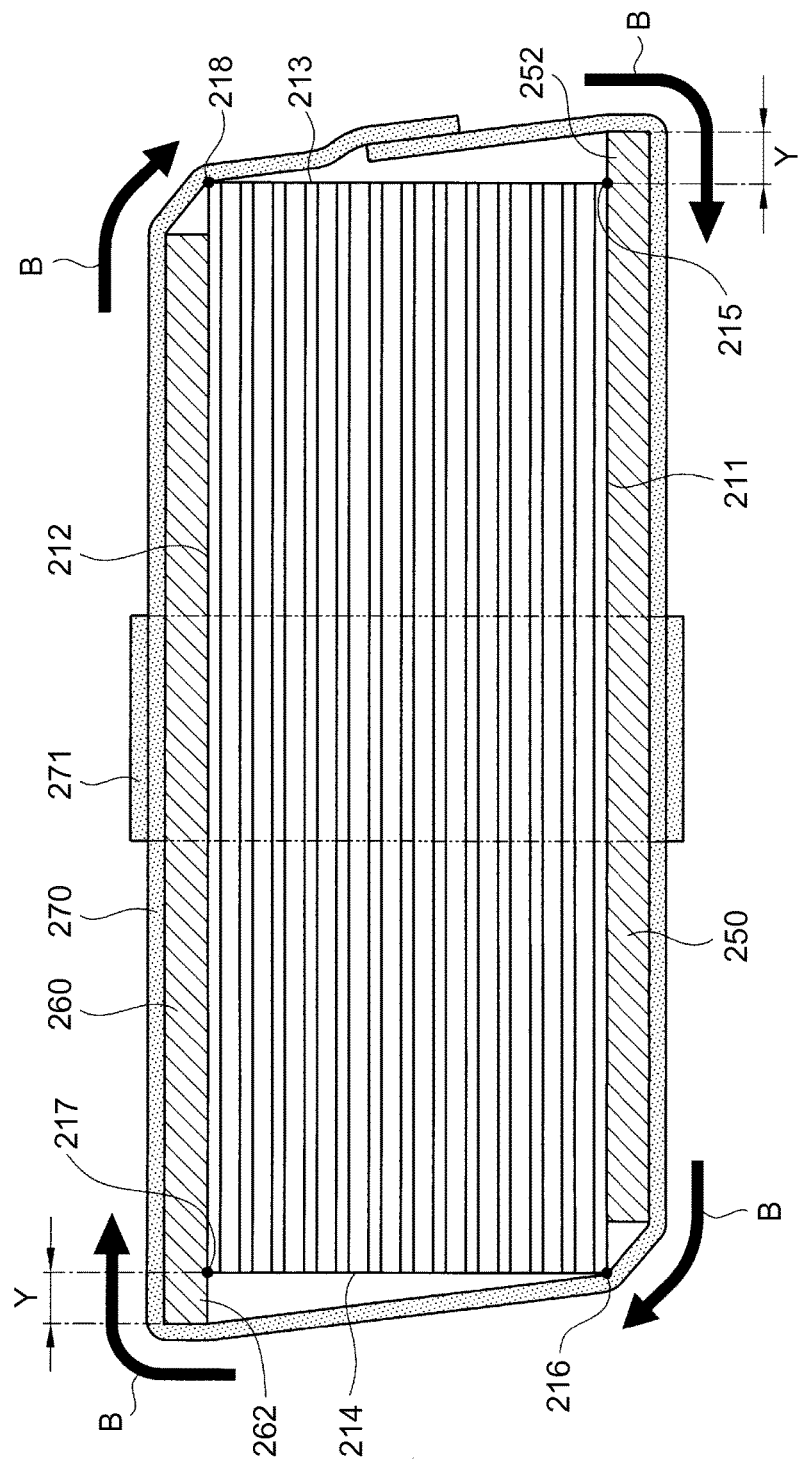
FIG. 7 is a sectional view of the electrode body according to the second embodiment, viewed at the position of a fixing tape.

Even in this embodiment, the electrode body 210 having high quality due to the protection members 250, 260 can be manufactured. FIG. 7 is a sectional view of the electrode body 210 viewed at the position of the fixing tape 270. The fixing tape 270 of this embodiment is wound to make one revolution around the outside of the electrode body 210 in the direction of arrow B.

That is, in the fixing process, the fixing tape 270 is wound in order of the end surface 211, the side surface 214, the end surface 212, and the side surface 213 starting from the side surface 213 of the electrode body 210. Therefore, on the side surface 213, the fixing tape 270 is wound in a direction from the end surface 212 toward the end surface 211. On the side surface 214, the fixing tape 270 is wound in a direction from the end surface 211 toward the end surface 212.

As illustrated in FIG. 7, the protection member 250 of this embodiment is disposed on the end surface 211 at a corner 215 of the electrode body 210. In addition, the protection member 250 includes a protrusion 252 which protrudes from the side surface 213 of the electrode body 210 by a length Y. The protection member 260 is also disposed on the end surface 212 at a corner 217 of the electrode body 210 and also includes a protrusion 262 which protrudes from the side surface 214 of the electrode body 210 by the length Y.

Specifically, on the side surface 213 of the electrode body 210, the fixing tape 270 is wound in a direction from the end surface 212 toward the end surface 211 of the electrode body 210 in a state where the protection member 250 is disposed on the end surface 211 at the corner 215. In addition, on the side surface 214 of the electrode body 210, the fixing tape 270 is wound in a direction from the end surface 211 toward the end surface 212 of the electrode body 210 in a state where the protection member 260 is disposed on the end surface 212 at the corner 217.

Therefore, when the fixing tape 270 is wound, both of the vicinity of the corner 215 of the side surface 213 of the electrode body 210 and the vicinity of the corner 217 of the side surface 214 do not come into contact with the fixing tape 270. Accordingly, even in this embodiment, the occurrence of curling at the corners 215, 217 of the electrode body 210 is prevented.

In a case where the fixing tape 270 is wound in the direction of arrow B, a protection member may not be provided at corners 216, 218 of the electrode body 210. This is because the fixing tape 270 is wound in the direction from the end surface 211 toward the side surface 214 at the corner 216 and the fixing tape 270 is wound in the direction from the end surface 212 toward the side surface 213 at the corner 218. When a protection member is not provided at the corner 216 and the corner 218, curling does not occur.

The same is applied to the fixing tape 271 illustrated in FIG. 6, which is wound to intersect the fixing tape 270. That is, the protection members 250, 260 have, on the side surfaces around which the fixing tape 271 of the electrode body 210 is wound, protrusions 251, 261 which protrude from the side surfaces by a length X at corners on the downstream side of the wound tape. Therefore, during the winding of the fixing tape 271 in the direction of arrow C, curling does not occur at the corners of the electrode body 210.

Accordingly, even in the electrode body 210 of this embodiment, curling due to the winding of the fixing tapes 270, 271 does not occur, and sufficient performance can be stably exhibited during charging and discharging. Furthermore, since there is no possibility that curling occurs in the electrode body 210 due to the protection members 250, 260, the fixing tapes 270, 271 can be wound while being strongly pulled. In addition, even in this embodiment, by increasing the binding force of the fixing tapes 270, 271, a positional shift of the positive plate 120, the negative plate 130, and the separator 140 in the electrode body 210 can be further suppressed compared to the related art.

Moreover, the protection member 260 of this embodiment includes the protrusion 261 which protrudes upward from the upper side surface of the electrode body 210 excluding the positive electrode tab 123 and the negative electrode tab 133, by the length X. In addition, as in the electrode body 110 described with reference to FIG. 5, the electrode body 210 can also be accommodated in the case body 103 by pressing the protrusion 261 of the protection member 260 in a state where the lower side surface of the electrode body 210 is directed toward the opening 106 of the case body 103. That is, in this embodiment, the protrusion 261 functions as a pressing portion.

Accordingly, the accommodation process can be performed without crushing the upper side surface of the electrode body 210 formed by the end portions of the positive plates 120, the negative plates 130, and the separators 140 which have low bending strength. In the battery subjected to the accommodation process by pressing the protrusion 261 of the protection member 260 as described above, the electrode body 210 is accommodated in the battery case 102 such that the side surface from which the protrusion 261 of the protection member 260 protrudes is directed toward the sealing member 104 side.

In this embodiment, the protection members 250, 260 having high strength are provided on the end surfaces 211, 212 of the electrode body 210. Furthermore, the protrusions 252, 262 of the protection members 250, 260 having high strength protrude from the side surfaces 213, 214 of the electrode body 210. Therefore, even in this embodiment, the protection members 250, 260 can be used to determine the position of the electrode body 210 in the battery case 102. Accordingly, the positioning of the electrode body 210 can be performed without generating wrinkles or the like on the electrode body 210.

It is preferable that the protection members 250, 260 also have resistance to the electrolyte 101 and have insulating properties, and PP or PE may be used. For example, the separator 140 of the electrode body 210 may be allowed to be adjacent to the protection members 250, 260. Otherwise, in a case where the positive plate 120 or the negative plate 130 is allowed to be adjacent to the protection members 250, 260, as the positive plate 120 or the negative plate 130, a positive plate or a negative plate in which the positive active material layer 122 or the negative active material layer 132 is formed on the surface that comes into contact with the protection members 250, 260 may be used.

As described above in detail, the fixing tapes 270, 271 are wound around the electrode body 210 according to this embodiment. The fixing tapes 270, 271 are wound in the directions of arrows B and C in the state where the protection members 250, 260 are disposed on the electrode body 210. Accordingly, even in this embodiment, a method of manufacturing a secondary battery having a stacked electrode body in which curling of an electrode plate or the like due to winding of a fixing tape does not occur, and the secondary battery are realized.

Both of the protection members 250, 260 described above have the protrusions 251, 252, 261, 262 which protrude outward from the side surfaces of the electrode body 210 at the corners of objects of the electrode body 210 to be protected. However, the protection members 250, 260 may not be provided with the protrusions 251, 252, 261, 262. That is, the protection members 250, 260 on the end surfaces of the electrode body 210 may have at least portions that extend to the side surfaces of the corners of the objects of the electrode body 210 to be protected. This is because curling at the corners of the objects of the electrode body 210 to be protected can be suppressed to a certain degree during the winding of the fixing tapes 270, 271.

Third Embodiment

A third embodiment will be described. In the third embodiment, a different protection member from those of the above-described embodiments is used. Hereinafter, an electrode body and the protection member of this embodiment will be described in detail.

Figure 8:
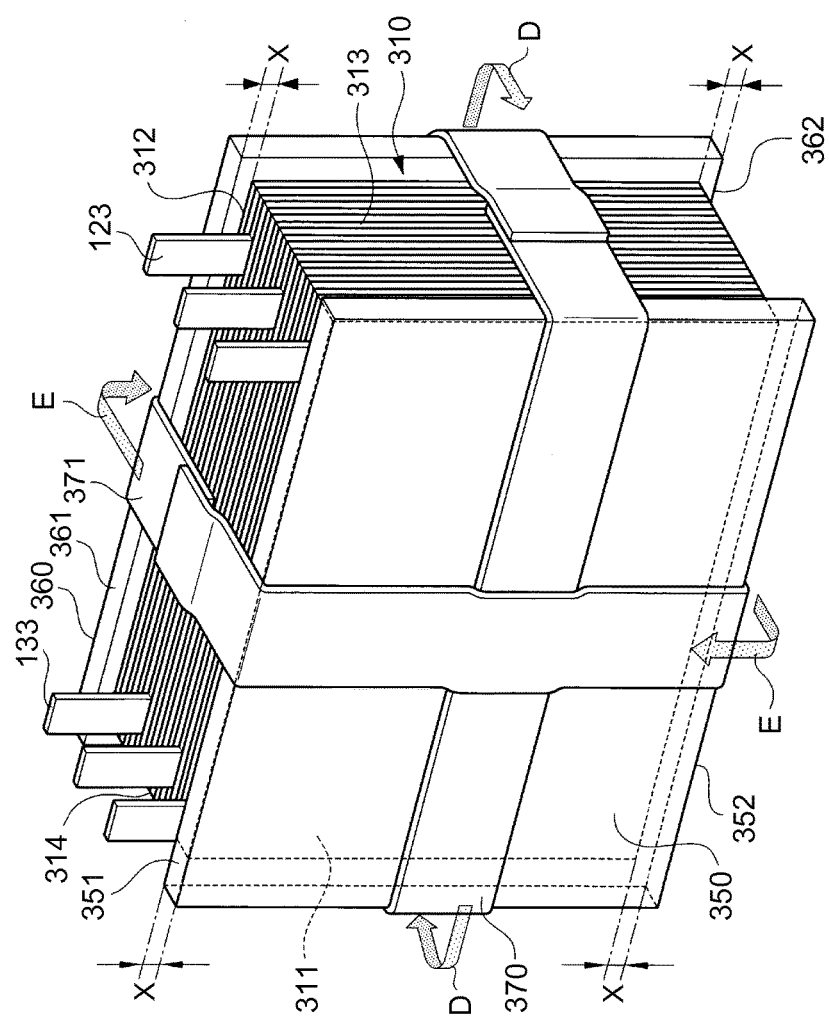
FIG. 8 is a perspective view of an electrode body according to a third embodiment.

FIG. 8 is a perspective view of an electrode body 310 according to this embodiment. As in the above-described embodiments, the electrode body 310 of this embodiment is also made by stacking of a plurality of the positive plates 120 and the negative plates 130 while interposing the separators 140 therebetween in a state where the positive electrode tabs 123 and the negative electrode tabs 133 protrude.

Protection members 350, 360 which are different from those of the above-described embodiments may be assembled to the electrode body 310 of this embodiment. Both of the protection members 350, 360 have higher bending strength than any of the positive plate 120, the negative plate 130, and the separator 140. The protection members 350, 360 are plate-like members which are respectively disposed on one end surface 311 of the electrode body 310 in the stacking direction and on an end surface 312 on the opposite side of the end surface 311. That is, fixing tapes 370, 371 are wound around the electrode body 310 of this embodiment in a state where the electrode body 310 is interposed between the protection members 350, 360 from both sides in the stacking direction thereof.

As illustrated in FIG. 8, the fixing tapes 370, 371 are wound to each make one revolution so as to intersect each other on the protection members 350, 360. The fixing tape 370 is wound in a direction of arrow D illustrated in FIG. 8 to make one revolution and is bonded on a right side surface 313 of the electrode body 310. The fixing tape 371 is wound in a direction of arrow E illustrated in FIG. 8 to make one revolution and is bonded on the upper side surface of the electrode body 310.

Even in the electrode body 310 of this embodiment, the positive electrode tabs 123 and the negative electrode tabs 133 which protrude from the upper side surface may be respectively bound and connected to the positive electrode terminal 124 and the negative electrode terminal 134, and the electrode body 310 is accommodated in the battery case 102 along with the electrolyte 101, thereby forming a battery. Even in the battery where the electrode body 310 is accommodated, charging and discharging can be performed by the electrode body 310 via the positive electrode terminal 124 and the negative electrode terminal 134.

In addition, the battery which uses the electrode body 310 may also be manufactured in the same order as in the above-described embodiments. That is, in the "1. Stacking process", the electrode body 310 is formed by stacking the positive plates 120, the negative plates, 130, and the separators 140. In addition, in the stacking process, the protection members 350, 360 are respectively stacked on the end surfaces 311, 312 of the electrode body 310 so as to be disposed thereon.

Next, in the "2. Fixing process", the fixing tapes 370, 371 are wound. That is, the fixing tape 370 is first wound around the outside of the electrode body 310 having the protection members 350, 360 disposed at predetermined positions, in a direction of arrow D illustrated in FIG. 8, and the starting end and the tail end of the wound tape are bonded to each other. The fixing tape 371 is then wound in a direction of arrow E illustrated in FIG. 8, and the starting end and the tail end of the wound tape are bonded to each other. In order to fix the electrode body 310, during the winding of the fixing tapes 370, 371, the fixing tapes 370, 371 are also wound while the tail end sides thereof are pulled to certain degrees.

Subsequently, the "3. Accommodation process" is performed. That is, in the accommodation process, the electrode body 310 and the electrolyte 101 around which the fixing tapes 370, 371 are wound are accommodated in the battery case 102. Accordingly, the battery having the electrode body 310 accommodated therein can be manufactured.

Figure 9:
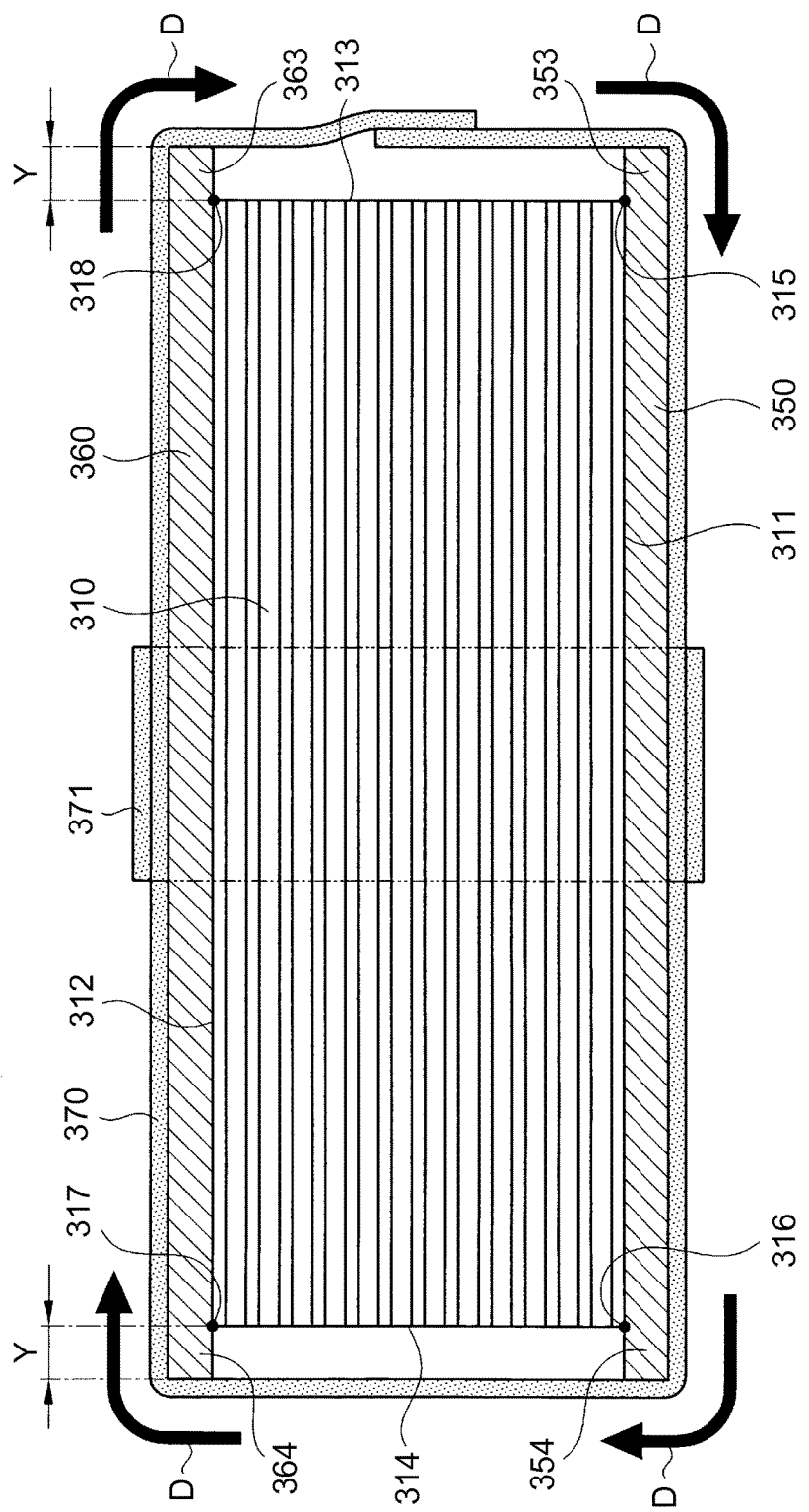
FIG. 9 is a sectional view of the electrode body according to the third embodiment, viewed at the position of a fixing tape.

Even in this embodiment, the electrode body 310 having high quality due to the protection members 350, 360 can be manufactured. FIG. 9 is a sectional view of the electrode body 310 viewed at the position of the fixing tape 370. The fixing tape 370 of this embodiment is wound to make one revolution around the outside of the electrode body 310 in the direction of arrow D.

That is, in the fixing process, the fixing tape 370 is wound in order of the end surface 311, the side surface 314, the end surface 312, and the side surface 313 starting from the side surface 313 of the electrode body 310. Therefore, on the side surface 313, the fixing tape 370 is wound in a direction from the end surface 312 toward the end surface 311. On the side surface 314, the fixing tape 370 is wound in a direction from the end surface 311 toward the end surface 312.

In this embodiment, as illustrated in FIG. 9, the protection member 350 disposed on the end surface 311 of the electrode body 310 have protrusions 353, 354 which protrude from the side surfaces 313, 314 of the electrode body 310 by a length Y. The protection member 360 disposed on the end surface 312 of the electrode body 310 has protrusions 363, 364 which protrude from the side surfaces 313, 314 of the electrode body 310 by the length Y.

Therefore, in this embodiment, when the fixing tape 370 is wound, both of the side surfaces 313, 314 of the electrode body 310 do not come into contact with the fixing tape 370. Accordingly, even in this embodiment, the occurrence of curling at corners 315, 317 of the electrode body 310 is prevented. In addition, in this embodiment, portions of the electrode body 310 at corners 316, 318 are not deformed in an inward direction of the stacking direction of the electrode body 310 when the fixing tape 370 is wound while being pulled.

The same is applied to the fixing tape 371 illustrated in FIG. 8, which is wound to intersect the fixing tape 370. That is, the protection member 350 has protrusions 351, 352 which protrude by a length X from the upper and lower side surfaces of the electrode body 310 around which the fixing tape 371 is wound. The protection member 360 also has protrusions 361, 362 which protrude by the length X from the upper and lower side surfaces of the electrode body 310 around which the fixing tape 371 is wound. Therefore, during the winding of the fixing tape 371 in the direction of arrow E, curling does not occur at the corners of the electrode body 310.

Accordingly, even in the electrode body 310 of this embodiment, curling due to the winding of the fixing tapes 370, 371 does not occur, and sufficient performance can be stably exhibited during charging and discharging. Furthermore, since there is no possibility that curling occurs in the electrode body 310 due to the protection members 350, 360, the fixing tapes 370, 371 can be wound while being strongly pulled. In addition, even in this embodiment, by increasing the binding force of the fixing tapes 370, 371, a positional shift of the positive plate 120, the negative plate 130, and the separator 140 in the electrode body 310 can be further suppressed compared to the related art.

Moreover, the protection members 350, 360 of this embodiment include the protrusions 351, 361 which protrude upward from the upper side surface of the electrode body 310 excluding the positive electrode tab 123 and the negative electrode tab 133, by the length X. In addition, as in the electrode body 110 described with reference to FIG. 5, the electrode body 310 can also be accommodated in the case body 103 by pressing the protrusions 351, 361 of the protection members 350, 360 in a state where the lower side surface of the electrode body 310 is directed toward the opening 106 of the case body 103. That is, in this embodiment, the protrusions 351, 361 function as a pressing portion.

Accordingly, the accommodation process can be performed without crushing the upper side surface of the electrode body 310 formed by the end portions of the positive plates 120, the negative plates 130, and the separators 140 which have low bending strength. In the battery subjected to the accommodation process by pressing the protrusions 351, 361 of the protection members 350, 360 as described above, the electrode body 310 is accommodated in the battery case 102 such that the upper side surface from which the protrusions 351, 361 protrude is directed toward the sealing member 104 side.

Furthermore, the protrusions 351, 352, 353, 354 of the protection member 350 of this embodiment protrude from the side surfaces of the electrode body 310. The protrusions 361, 362, 363, 364 of the protection member 360 also protrude from the side surfaces of the electrode body 310. In addition, the protruding amounts of the protrusions 351, 352, 353, 354 of the protection member 350 are equal to the protruding amounts of the protrusions 361, 362, 363, 364 of the protection member 360 which protrude in corresponding directions. Therefore, in this embodiment, the position of the electrode body 310 in the battery case 102 can be determined by the protection members 350, 360 with higher accuracy than that in the above-described embodiments.

It is preferable that the protection members 350, 360 also have resistance to the electrolyte 101 and have insulating properties, and PP or PE may be used. For example, the separator 140 of the electrode body 310 may be allowed to be adjacent to the protection members 350, 360. Otherwise, in a case where the positive plate 120 or the negative plate 130 is allowed to be adjacent to the protection members 350, 360, as the positive plate 120 or the negative plate 130, a positive plate or a negative plate in which the positive active material layer 122 or the negative active material layer 132 is formed on the surface that comes into contact with the protection members 350, 360 may be used.

As described above in detail, the fixing tapes 370, 371 are wound around the electrode body 310 according to this embodiment. The fixing tapes 370, 371 are wound in the directions of arrows D and E in the state where the protection members 350, 360 are disposed on the electrode body 310. Accordingly, even in this embodiment, a method of manufacturing a secondary battery having a stacked electrode body in which curling of an electrode plate or the like due to winding of a fixing tape does not occur, and the secondary battery are realized.

Figure 10:
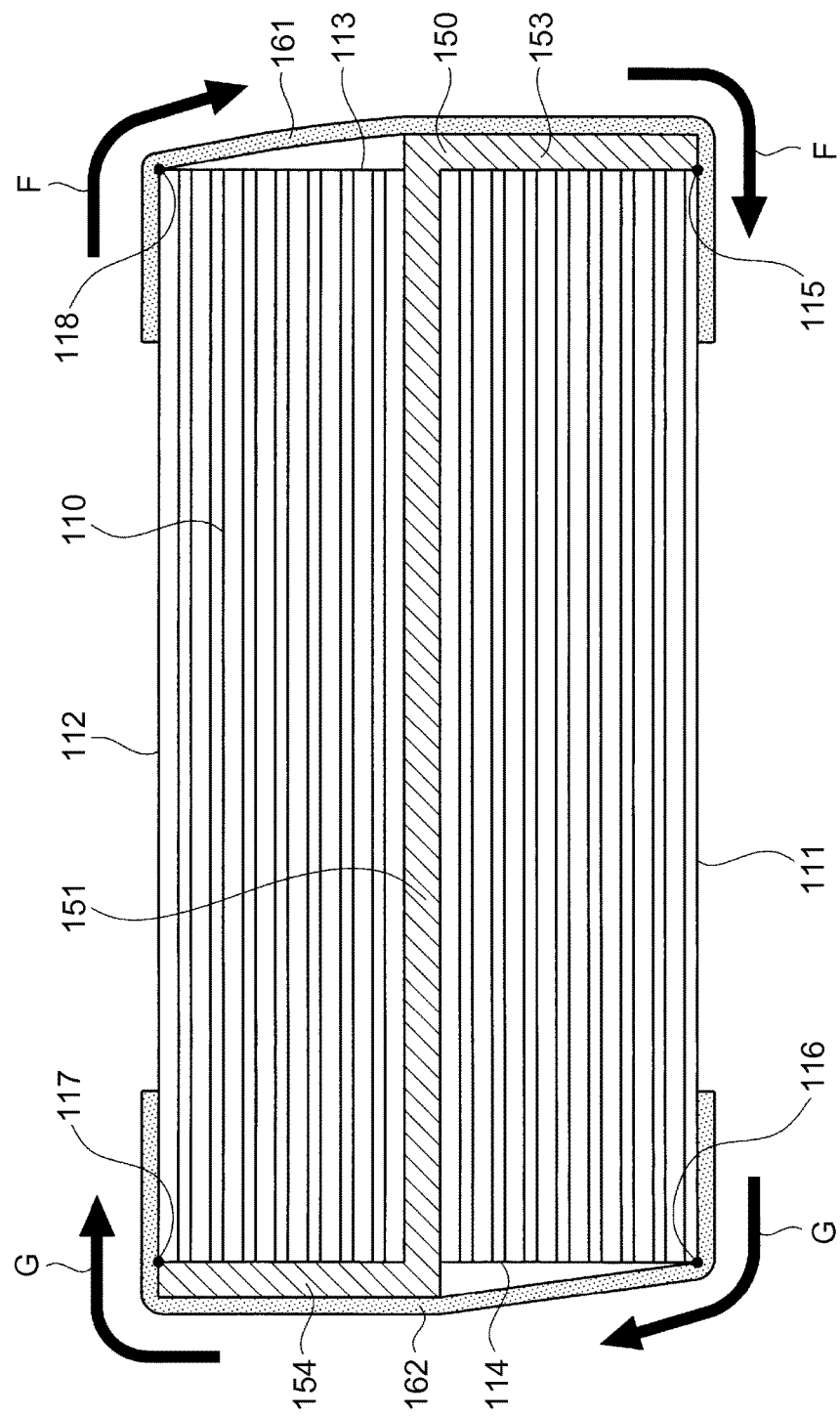
FIG. 10 is a view illustrating a modification example of the fixing tape of the first embodiment.

Each of the above-described embodiments is merely an example and does not limit the invention. Therefore, it is natural that various modifications and changes of the invention can be made without departing from the concept thereof. For example, it is described in the first embodiment that the fixing tape 160 is wound to make one revolution around the outside of the electrode body 110. However, as illustrated in FIG. 10, fixing tapes 161, 162 which are cut on the end surfaces 111, 112 of the electrode body 110 may also be used. As illustrated in FIG. 10, the fixing tape 161 is wound around the side surface 113 of the electrode body 110 in a direction of arrow F from the end surface 112 to the end surface 111. The fixing tape 162 is wound around the side surface 114 of the electrode body 110 in a direction of arrow G from the end surface 111 to the end surface 112. The starting ends and the tail ends of the fixing tapes 161, 162 are bonded to the end surfaces 111, 112 of the electrode body 110. Even in the case of using the fixing tapes 161, 162, curling of the corners of the electrode body 110 due to the winding of the fixing tapes 161, 162 may be prevented by the protection member 150.

Figure 11:
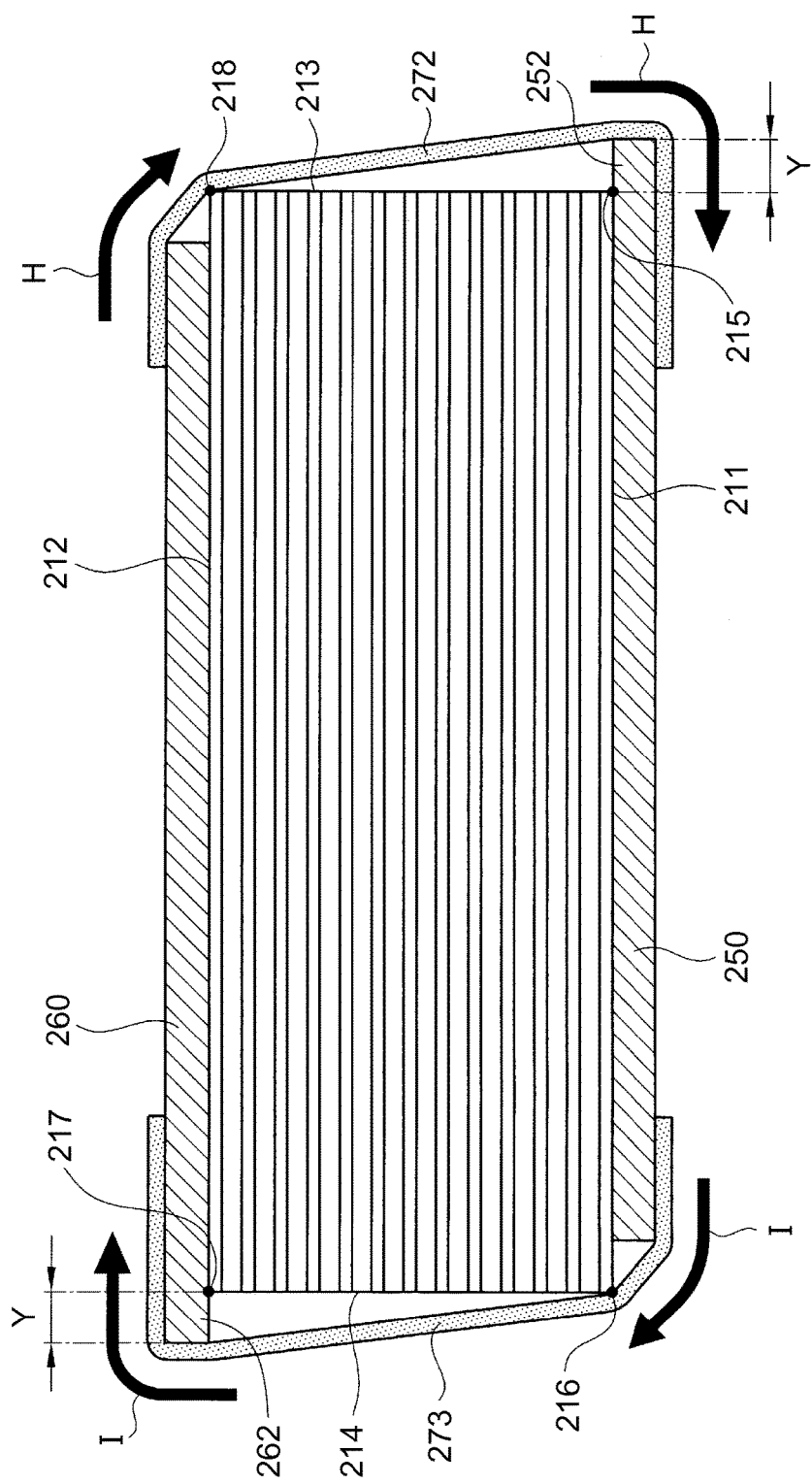
FIG. 11 is a view illustrating a modification example of the fixing tape of the second embodiment.

Even in the second embodiment described above, it is described that the fixing tape 270 is wound to make one revolution around the outer periphery of the electrode body 210. However, as in FIG. 10, fixing tapes 272, 273 illustrated in FIG. 11 may also be used. In FIG. 11, the fixing tape 272 is wound around the side surface 213 of the electrode body 210 in a direction of arrow H from the end surface 212 to the end surface 211. The fixing tape 273 is wound around the side surface 214 of the electrode body 210 in a direction of arrow I from the end surface 211 to the end surface 212. The starting ends and the tail ends of the fixing tapes 272, 273 are bonded to the protection members 250, 260 on the end surfaces 211, 212 of the electrode body 210. Even in the case of using the fixing tapes 272, 273, curling of the corners of the electrode body 210 due to the winding of the fixing tapes 272, 273 may be prevented by the protection members 250, 260.

Figure 12:
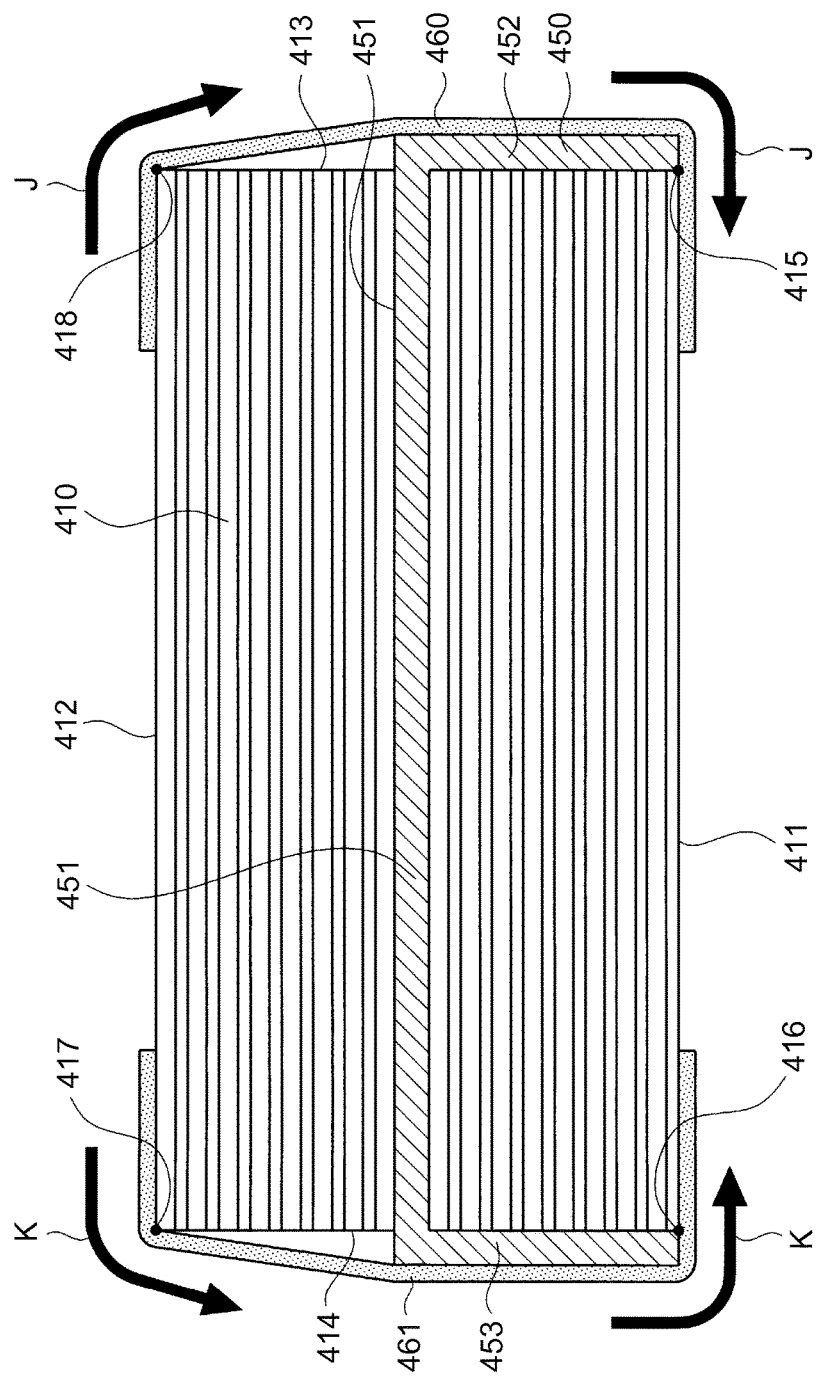
FIG. 12 is a view illustrating a modification example of the invention.

As illustrated in FIG. 12, in a case where two fixing tapes 460, 461 are both wound in a direction from an end surface 412 toward an end surface 411 of an electrode body 410, a protection member 450 which has a different shape from that of the first embodiment may be used. As illustrated in FIG. 12, the protection member 450 includes a stacked portion 451 interposed between the stacks of the electrode body 410, and side surface portions 452, 453 which are respectively positioned on side surfaces 413, 414 of the electrode body 410. The side surface portion 452 of the protection member 450 extends from an end of the stacked portion 451 on the side surface 413 side of the electrode body 410 to a corner 415 of the electrode body 410. The side surface portion 453 of the protection member 450 extends from an end of the stacked portion 451 on the side surface 414 side of the electrode body 410 to a corner 416 of the electrode body 410. The fixing tape 460 is wound around the side surface 413 of the electrode body 410 in a direction of arrow J from the end surface 412 to the end surface 411. The fixing tape 461 is wound around the side surface 414 of the electrode body 410 in a direction of arrow K from the end surface 412 to the end surface 411. The starting ends and the tail ends of the fixing tapes 460, 461 are bonded to the end surfaces 411, 412 of the electrode body 410. In addition, curling of the electrode body 410 at the corners 415, 416 during winding of the fixing tapes 460, 461 can be prevented by the protection member 450 illustrated in FIG. 12. At corners 417, 418, curling due to the winding of the fixing tapes 460, 461 does not occur, and thus a protection member may not be provided.

Figure 13:
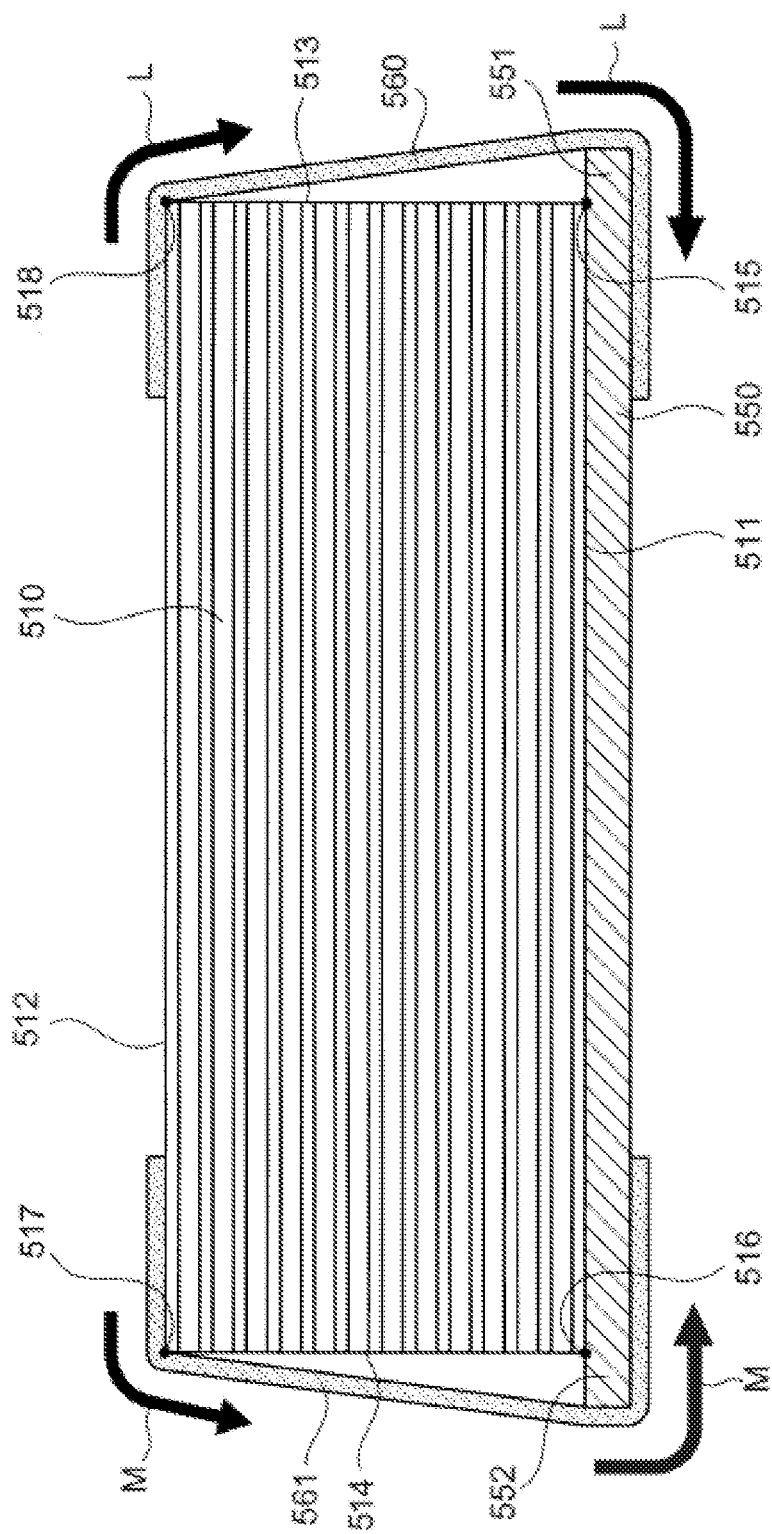
FIG. 13 is a view illustrating a different modification example of the invention from that in FIG. 12.

In a case where two fixing tapes 560, 561 are both wound in a direction from an end surface 512 toward an end surface 511 of an electrode body 510, a protection member 550 as illustrated in FIG. 13 may be used. As illustrated in FIG. 13, the protection member 550 is disposed on the end surface 511 of the electrode body 510. The protection member 550 includes protrusions 551, 552 which respectively protrude from side surfaces 513, 514 of the electrode body 510. The fixing tape 560 is wound around the side surface 513 of the electrode body 510 in a direction of arrow L from the end surface 512 to the end surface 511. The fixing tape 561 is wound around the side surface 514 of the electrode body 510 in a direction of arrow M from the end surface 512 to the end surface 511. The starting ends and the tail ends of the fixing tapes 560, 561 are bonded to the end surface 512 of the electrode body 510 and the protection member 550. In addition, curling of the electrode body 510 at corners 515, 516 during winding of the fixing tapes 560, 561 can be prevented by the protection member 550 illustrated in FIG. 13. At corners 517, 518, curling due to the winding of the fixing tapes 560, 561 does not occur, and thus a protection member may not be provided.

In the above-described embodiments, the battery having the electrode body which is made by flat stacking of the positive plates 120, the negative plates 130, and the separators 140 which have thin flat plate shapes is described. However, the stacked electrode body is not limited to the stacked shape formed by flat stacking of those having flat plate shapes, and for example, a configuration in which at least one of positive plates, negative plates, and separators have a folded shape and these are alternately stacked may also be used. Furthermore, the invention is not limited to, for example, a lithium-ion secondary battery and may also be applied to other batteries having a stacked electrode body.

What is claimed is:

1. A secondary battery comprising:
a stacked electrode body which is made by stacking a positive plate and a negative plate while interposing a separator between the positive plate and the negative plate;
a fixing tape which is wound around an outside of the stacked electrode body and prevents deformation of the electrode body;
a battery case in which the electrode body around which the fixing tape is wound and an electrolyte are accommodated; and
a protection member which is positioned between the fixing tape and the electrode body and has higher bending strength than any of the positive plate, the negative plate, and the separator, wherein
the fixing tape is wound, across at least a first end surface and a second end surface positioned at both ends of the electrode body in a stacking direction of the electrode body, around a first side surface adjacent to the first end surface and the second end surface of the electrode body and a second side surface which is a rear surface of the first side surface, from the outside of the stacked electrode body, and
the protection member is disposed between at least one of the first end surface and the first side surface and the fixing tape at a first corner where the first end surface and the first side surface of the electrode body intersect, and the protection member is disposed between at least one of the first end surface and the second side surface and the fixing tape at a second corner which is positioned on the opposite side of the first corner of the electrode body with the first end surface interposed between the first corner and the second corner, or between at least one of the second end surface and the second side surface and the fixing tape at a third corner which is positioned on the opposite side of the second corner of the electrode body with the second side surface interposed between the second corner and the third corner, wherein
the protection member includes a first side surface portion positioned on the first side surface of the electrode body, a second side surface portion positioned on the second side surface of the electrode body, and a stacked portion which is positioned between a first stack of the electrode body and a second stack of the electrode body, and of which both ends are respectively connected to the first side surface portion and the second side surface portion, wherein the stacked portion is one piece including opposing first and second surfaces, wherein the first surface contacts the first stack and the second surface contacts the second stack,
the first side surface portion extends from the end of the stacked portion on the first side surface side toward the first corner, and
the second side surface portion extends from the end of the stacked portion on the second side surface side toward the second or the third corner.

2. The secondary battery according to claim 1, wherein the second side surface portion extends from the end of the stacked portion on the second side surface side toward the third corner.

3. The secondary battery according to claim 1,
wherein the battery case includes a case body having an opening and a sealing member which block the opening of the case body,
the protection member includes a pressing portion that protrudes from one side surface among the first side surface and the second side surface adjacent, respectively, to the first end surface and the second end surface of the electrode body, and
the electrode body is accommodated in an inner portion of the battery case while the side surface from which the pressing portion of the protection member protrudes is directed toward a side of the sealing member.

4. A method of manufacturing a secondary battery which includes a stacked electrode body which is made by stacking a positive plate and a negative plate while interposing a separator between the positive plate and the negative plate, a fixing tape which is wound around an outside of the stacked electrode body and prevents deformation of the electrode body, and a battery case in which the electrode body around which the fixing tape is wound and an electrolyte are accommodated, the method comprising:
stacking the positive plate, the negative plate, and the separator, forming the electrode body through the stacking, and disposing a protection member having higher bending strength than any of the positive plate, the negative plate, and the separator on at least an outer peripheral surface of the electrode body;
winding the fixing tape, across at least a first end surface and a second end surface positioned at both ends of the electrode body in a stacking direction of the electrode body, around a first side surface adjacent to the first end surface and the second end surface of the electrode body and a second side surface which is a rear surface of the first side surface, from a portion of the outer peripheral surface of the electrode body on which the protection member is disposed, and fixing the fixing tape; and
accommodating the electrode body around which the fixing tape is wound and the electrolyte in the battery case, wherein
during the stacking, the protection member is disposed on at least one of the first end surface and the first side surface at a first corner where the first end surface and the first side surface of the electrode body intersect, and at least one of the second end surface and the second side surface at a second corner where the second end surface and the second side surface of the electrode body intersect, and
during the fixing, the fixing tape is wound around the first side surface of the electrode body in a direction from the second end surface toward the first end surface, and is wound around the second side surface of the electrode body in a direction from the first end surface toward the second end surface, wherein
the protection member includes a first side surface portion positioned on the first side surface of the electrode body in a state where the protection member is disposed on the electrode body, a second side surface portion positioned on the second side surface of the electrode body, and a stacked portion which is positioned between a first stack of the electrode body and a second stack of the electrode body, and of which both ends are respectively connected to the first side surface portion and the second side surface portion, wherein the stacked portion is one piece including opposing first and second surfaces, wherein the first surface contacts the first stack and the second surface contacts the second stack, the first side surface portion extends from the end of the stacked portion on the first side surface side toward the first corner, and the second side surface portion extends from the end of the stacked portion on the second side surface side toward the second corner.

5. The method of manufacturing a secondary battery according to claim 4, wherein the battery case which includes a case body having an opening and a sealing member which blocks the opening of the case body is used, the protection member is used which includes a pressing portion that protrudes from one side surface among the first side surface and the second surface adjacent, respectively, to the first end surface and the second end surface of the electrode body in a state where the protection member is disposed on the electrode body, and during the accommodating, the electrode body is accommodated in an inner portion of the case body which is positioned further inward than the opening by pressing the pressing portion toward the inner portion of the case body while the side surface on the opposite side of the side surface of the electrode body from which the pressing portion of the protection member protrudes is directed toward the opening of the case body, and the opening of the case body having the electrode body accommodated in the inner portion of the case body is sealed by the sealing member.

\* \* \* \* \*